United States Patent
Wu et al.

(10) Patent No.: US 9,717,028 B2
(45) Date of Patent: Jul. 25, 2017

(54) NETWORK HANDOVER METHOD, DEVICE, AND SYSTEM BETWEEN PACKET-SWITCHED AND CIRCUIT-SWITCHED SYSTEMS

(71) Applicant: Huawei Technologies Co., Ltd., Shenzhen, Guangdong (CN)

(72) Inventors: Xiaobo Wu, Shanghai (CN); Hai Liu, Shanghai (CN); Daliang Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/966,317

(22) Filed: Dec. 11, 2015

(65) Prior Publication Data
US 2016/0105832 A1   Apr. 14, 2016

Related U.S. Application Data

(63) Continuation of application No. PCT/CN2013/077193, filed on Jun. 13, 2013.

(51) Int. Cl.
*H04W 36/02* (2009.01)
*H04W 36/14* (2009.01)
*H04W 36/00* (2009.01)

(52) U.S. Cl.
CPC ....... *H04W 36/14* (2013.01); *H04W 36/0022* (2013.01)

(58) Field of Classification Search
CPC .................. H04W 36/14; H04W 36/0022
See application file for complete search history.

(56) References Cited

U.S. PATENT DOCUMENTS

2011/0216645 A1* 9/2011 Song ............... H04W 36/0022
                                                              370/216
2012/0122459 A1* 5/2012 Wu .................. H04W 36/0022
                                                              455/437

(Continued)

FOREIGN PATENT DOCUMENTS

CN          102045791 A      5/2011
CN          102045803 A      5/2011

(Continued)

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 12)", 3GPP TS 23.401 V12.0.0, Mar. 2013, 290 pages.

(Continued)

*Primary Examiner* — Christopher M Brandt

(57) ABSTRACT

The present invention discloses a network handover method. After receiving a request message that requests circuit switched fallback (CSFB) and that is initiated by a UE located in an LTE network, an MME requests an MSC to hand over the UE from the LTE network to a CS domain of the 2G or 3G network; and after receiving a radio access bearer (RAB) sent by the MSC, the MME sends the RAB to the eNB, so that the RAB is sent by an eNB to the UE, where the RAB is a RAB whose domain identifier is a packet switched (PS) domain, or the RAB is a PS RAB. Therefore, the UE can be handed over to a PS domain of the 2G or 3G network in a manner of being handed over from the LTE network to the CS domain of the 2G or 3G network.

20 Claims, 10 Drawing Sheets

(56) References Cited

U.S. PATENT DOCUMENTS

2014/0016618 A1* 1/2014 Bae .................. H04W 36/0022
370/331
2014/0177599 A1 6/2014 Tao

FOREIGN PATENT DOCUMENTS

CN 102045805 A 5/2011
CN 102598775 A 7/2012

OTHER PUBLICATIONS

"3rd Generation Partnership Project; Technical Specification Group Radio Access Network; Evolved Universal Terrestrial Radio Access Network (E-UTRAN); S1 Application Protocol (S1AP) (Release 11)", 3GPP TS 36.413 V11.3.0, Mar. 2013, 274 pages.

"3rd Generation Partnership Project; Technical Specification Group Radio Access Network; UTRAN architecture for 3G Home Node B (HNB); Stage 2 (Release 11)", 3GPP TS 25.467 V11.2.0, Mar. 2013, 80 pages.

"3rd Generation Partnership Project; Technical Specification Group Radio Access Network; Radio Resource Control (RRC); Protocol specification (Release 11)", 3GPP TS 25.331 V11.5.0, Mar. 2013, 2079 pages.

* cited by examiner

NETWORK HANDOVER METHOD, DEVICE, AND SYSTEM BETWEEN PACKET-SWITCHED AND CIRCUIT-SWITCHED SYSTEMS

CROSS-REFERENCE TO RELATED APPLICATIONS

This application is a continuation of International Application No. PCT/CN2013/077193, filed on Jun. 13, 2013, which is hereby incorporated by reference in its entirety.

TECHNICAL FIELD

The present invention relates to the field of communications technologies, and specifically, to a network handover method, device, and system.

BACKGROUND

Full coverage of a second generation (2G) or third generation (3G) network such as Global System for Mobile Communications (GSM) or Wideband Code Division Multiple Access (WCDMA) has been basically implemented.

With development of network technologies such as System Architecture Evolution (SAE) and Long Term Evolution (LTE) in a fourth generation (4G) network, and with development of an evolved High Speed Uplink Packet Access (HSUPA) and High Speed Downlink Packet Access (HSDPA) technology, and a worldwide interoperability for microwave access (WiMax) network technology, these 4G networks or these evolved 3G networks have covered some urban areas and traffic hotspot areas. In this way, in current communications networks, these 4G networks and these evolved 3G networks coexist with a 2G or 3G network.

In the 2G or 3G network, a circuit switched (CS) domain is used to bear session services such as voice calls, but in the 4G or evolved 3G network, a packet switched (PS) domain is used to bear session services.

Circuit switched fallback (CSFB) is that when processing a voice service, user equipment (UE) covered by an LTE network falls back to a CS domain network first, and processes the voice service in the CS domain network, thereby fulfilling an objective of reusing an existing CS domain device to provide a traditional voice service for a user in the LTE network.

In the prior art, when the UE supports only handover from the LTE network to a PS domain of the 2G or 3G network, the UE initiates a voice call after being handed over to the PS domain of the 2G or 3G network, and the entire voice call consumes a relatively long time, which leads to poor user experience.

SUMMARY

Embodiments of the present invention provide a network handover method. For a terminal that supports only a PS domain bearer, a network triggers handover from an LTE network to a CS domain of a 2G or 3G network, and provides a PS domain resource. Therefore, in a case in which a UE is handed over to the 2G or 3G network by using a PS domain resource, the network can prepare, for the UE in advance, a resource for a voice call in the CS domain, so as to shorten duration of an entire voice call and improve user experience. The embodiments of the present invention further provide corresponding devices and systems.

A first aspect of the present invention provides a network handover method, including:

receiving, by a mobility management entity MME, a request message sent by user equipment UE located in a Long Term Evolution LTE network, where the request message is used to request circuit switched fallback CSFB;

sending, by the MME, a first notification message to an evolved NodeB eNB according to the request message, where the first notification message is used to instruct the eNB to move the UE from the LTE network to a 2G or 3G network for the CSFB;

receiving, by the MME, a handover requirement message sent by the eNB;

sending, by the MME, a first handover request message to a mobile switching center MSC, where the first handover request message is used to request the MSC to hand over the UE from the LTE network to a circuit switched CS domain of the 2G or 3G network for the CSFB;

receiving, by the MME, a first handover request response message sent by the MSC, where the first handover request response message includes a radio access bearer RAB, and the RAB is a RAB whose domain identifier is a packet switched PS domain, or the RAB is a PS RAB; and sending, by the MME, a handover requirement response message to the eNB according to the first handover request response message, where the handover requirement response message includes the RAB, so that the RAB is sent by the eNB to the UE.

With reference to the first aspect, in a first possible implementation manner, the first handover request message includes first indication information, where the first indication information is used to request the MSC to hand over the UE from the LTE network to the CS domain of the 2G or 3G network for the CSFB; or the first indication information is used to request the MSC to hand over the UE from the LTE network to the CS domain of the 2G or 3G network for the CSFB and is used to indicate that the UE supports handover from the LTE network to a PS domain of the 2G or 3G network.

With reference to the first aspect or the first possible implementation manner of the first aspect, in a second possible implementation manner, the handover requirement message includes second indication information, where the second indication information is used to instruct the MME to hand over the UE from the LTE network to the CS domain of the 2G or 3G network for the CSFB; or the second indication information is used to request the MME to hand over the UE from the LTE network to the CS domain of the 2G or 3G network for the CSFB and is used to indicate that the UE supports the handover from the LTE network to the PS domain of the 2G or 3G network.

With reference to the first aspect or the first or second possible implementation manner of the first aspect, in a third possible implementation manner, the first notification message includes third indication information, where the third indication information is used to indicate that the LTE network and the 2G or 3G network support movement of the UE from the LTE network to the CS domain of the 2G or 3G network for the CSFB.

With reference to the third possible implementation manner of the first aspect, in a fourth possible implementation manner, that the LTE network and the 2G or 3G network support handover of the UE from the LTE network to the CS domain of the 2G or 3G network for the CSFB includes:

the LTE network and the 2G or 3G network support single radio voice call continuity SRVCC handover in the handover of the UE from the LTE network to the 2G or 3G network for the CSFB.

With reference to the first aspect or any possible implementation manner of the first to fourth possible implementation manners of the first aspect, in a fifth possible implementation manner, the handover requirement message is a message of requiring the handover from the LTE network to the PS domain of the 2G or 3G network, a message of requiring the handover from the LTE network to the CS domain of the 2G or 3G network, or a message of requiring handover from the LTE network to the PS domain and the CS domain of the 2G or 3G network.

A second aspect of the present invention provides a network handover method, including:

receiving, by a mobile switching center MSC, a first handover request message sent by a mobility management entity MME, where the first handover request message is used to request the MSC to hand over user equipment UE from a Long Term Evolution LTE network to a circuit switched CS domain of a 2G or 3G network for circuit switched fallback CSFB;

sending, by the MSC, a second handover request message to a base station of the 2G or 3G network, where the second handover request message is used to request the base station to hand over the UE from the LTE network to the CS domain of the 2G or 3G network for the CSFB;

receiving, by the MSC, a second handover request acknowledgement message sent by the base station, where the second handover request acknowledgement message includes a radio access bearer RAB, and the RAB is a RAB whose domain identifier is a packet switched PS domain, or the RAB is a PS RAB; and sending, by the MSC, a first handover request response message to the MME, where the first handover request response message includes the RAB.

With reference to the second aspect, in a first possible implementation manner, the second handover request message includes fourth indication information, where the fourth indication information is used to request the base station to hand over the UE from the LTE network to the CS domain of the 2G or 3G network for the CSFB; or the fourth indication information is used to request the base station to hand over the UE from the LTE network to the CS domain of the 2G or 3G network for the CSFB and is used to indicate that the UE supports handover from the LTE network to a PS domain of the 2G or 3G network.

With reference to the second aspect or the first possible implementation manner of the second aspect, in a second possible implementation manner, the first handover request message includes first indication information, where the first indication information is used to request the MSC to hand over the UE from the LTE network to the CS domain of the 2G or 3G network for the CSFB; or the first indication information is used to request the MSC to hand over the UE from the LTE network to the CS domain of the 2G or 3G network for the CSFB and is used to indicate that the UE supports the handover from the LTE network to the PS domain of the 2G or 3G network.

With reference to the second aspect or the first or second possible implementation manner of the second aspect, in a third possible implementation manner, the method further includes:

receiving, by the MSC, a first CS call connection request message sent by the UE, where the first CS call connection request message is used to request the MSC to generate a first session for the UE; or sending, by the MSC, a second CS call connection request message to the UE, where the second CS call connection request message is used to request the UE to generate a second session.

With reference to the third possible implementation manner of the second aspect, in a fourth possible implementation manner, the method further includes:

sending, by the MSC, a second notification message to the base station after receiving at least one of the following messages or after sending the second CS call connection request message, where the second notification message is used to request the base station to allocate a CS domain resource to the UE; where the following messages include a handover complete message sent by the base station, a connection management service request message sent by the UE, the first CS call connection request message sent by the UE, and a paging response message sent by the UE.

A third aspect of the present invention provides a network handover method, including:

receiving, by a base station of a 2G or 3G network, a second handover request message sent by a mobile switching center MSC, where the second handover request message is used to request the base station to hand over user equipment UE from a Long Term Evolution LTE network to a circuit switched CS domain of the 2G or 3G network for circuit switched fallback CSFB;

sending, by the base station, a second handover request acknowledgement message to the MSC, where the second handover request acknowledgement message includes a radio access bearer RAB, and the RAB is a RAB whose domain identifier is a packet switched PS domain, or the RAB is a PS RAB;

receiving, by the base station, a handover complete message sent by the UE; and sending, by the base station, a second notification message to the UE, where the second notification message includes a CS RAB allocated by the base station to the UE.

With reference to the third aspect, in a first possible implementation manner, the second handover request message includes fourth indication information, where the fourth indication information is used to request the base station to hand over the UE from the LTE network to the CS domain of the 2G or 3G network for the CSFB; or the fourth indication information is used to request the base station to hand over the UE from the LTE network to the CS domain of the 2G or 3G network for the CSFB and is used to indicate that the UE supports handover from the LTE network to a PS domain of the 2G or 3G network.

With reference to the third aspect or the first possible implementation manner of the third aspect, in a second possible implementation manner, the base station allocates the CS RAB to the UE before sending the second handover request acknowledgement message to the MSC, where the second handover request acknowledgement message does not include the CS RAB; or the base station allocates the CS RAB to the UE after sending the second handover request acknowledgement message to the MSC.

With reference to the third aspect or the first or second possible implementation manner of the third aspect, in a third possible implementation manner, the base station sends the second notification message to the UE after the base station receives a call setup message or a call acknowledgement message sent by the UE; or the base station sends the second notification message to the UE after the base station receives a call proceeding message sent by the MSC.

With reference to the third aspect or any possible implementation manner of the first to third possible implementation manners of the third aspect, in a fourth possible implementation manner, the method further includes: after the base station receives the handover complete message, sending, by the base station, universal mobile telecommunications system terrestrial radio access network UTRAN mobility information to the UE, where the UTRAN mobility information does not include a location area identity LAI; and sending, by the base station, the LAI to the UE after a preset time; or sending, by the base station, UTRAN mobility information to the UE, where the UTRAN mobility information does not include an LAI, and sending, by the base station, the LAI to the UE after receiving a call release command sent by the MSC, a call connection success message sent by the MSC, or a call connection success message sent by the UE.

With reference to the third aspect or any possible implementation manner of the first to fourth possible implementation manners of the third aspect, in a fifth possible implementation manner, the method further includes:

receiving, by the base station, a call release message sent by the MSC; and redirecting, by the base station, the UE to the LTE network according to the call release message, or handing over, by the base station, the UE to the LTE network according to the call release message.

With reference to the third aspect or any possible implementation manner of the first to fifth possible implementation manners of the third aspect, in a sixth possible implementation manner, the method further includes:

receiving, by the base station, a location update request message sent by the UE; and sending, by the base station, a location update accept message to the UE, and skipping sending, by the base station, the location update request message to the MSC.

A fourth aspect of the present invention provides a network handover method, including:

receiving, by an evolved NodeB eNB located in a Long Term Evolution LTE network, a first notification message sent by a mobility management entity MME, where the first notification message is used to instruct the eNB to move user equipment UE from the LTE network to a 2G or 3G network for circuit switched fallback CSFB;

sending, by the eNB, a handover requirement message to the MME, where the handover requirement message is a message of requiring handover from the LTE network to a circuit switched CS domain of the 2G or 3G network;

receiving, by the eNB, a handover requirement response message sent by the MME, where the handover requirement response message includes a radio access bearer RAB, and the RAB is a RAB whose domain identifier is a packet switched PS domain, or the RAB is a PS RAB; and sending, by the eNB, a handover command to the UE, where the handover command includes the RAB.

With reference to the fourth aspect, in a first possible implementation manner, the first notification message is further used to indicate that the LTE network and the 2G or 3G network support the handover of the UE from the LTE network to the CS domain of the 2G or 3G network for the CSFB.

With reference to the fourth aspect or the first possible implementation manner of the fourth aspect, in a second possible implementation manner, the method further includes:

the handover requirement message includes second indication information, where the second indication information is used to request the MME to hand over the UE from the LTE network to the CS domain of the 2G or 3G network for the CSFB; or the second indication information is used to request the MME to hand over the UE from the LTE network to the CS domain of the 2G or 3G network for the CSFB and is used to indicate that the UE supports handover from the LTE network to a PS domain of the 2G or 3G network; or a source-to-target container in the handover requirement message includes fifth indication information, where the fifth indication information is used to request a base station of the 2G or 3G network to hand over the UE from the LTE network to the CS domain of the 2G or 3G network for the CSFB; or a source-to-target container in the handover requirement message includes fifth indication information, where the fifth indication information is used to request a base station of the 2G or 3G network to hand over the UE from the LTE network to the CS domain of the 2G or 3G network for the CSFB and is used to indicate that the UE supports handover from the LTE network to a PS domain of the 2G or 3G network.

With reference to the fourth aspect or the first possible implementation manner of the fourth aspect, in a third possible implementation manner, the handover requirement message includes UE capability information, so that a first handover request message sent by the MME to a mobile switching center MSC includes the UE capability information.

With reference to the fourth aspect or any possible implementation manner of the first to third possible implementation manners of the fourth aspect, in a fourth possible implementation manner, the method further includes:

before the eNB sends the handover requirement message to the MME, determining, by the eNB, that the UE supports the handover from the LTE network to the PS domain of the 2G or 3G network; and/or before the eNB sends the handover command to the UE, determining, by the eNB, that the UE supports the handover from the LTE network to the PS domain of the 2G or 3G network.

A fifth aspect of the present invention provides a mobility management entity, including:

a receiving unit, configured to receive a request message sent by user equipment UE located in a Long Term Evolution LTE network, where the request message is used to request circuit switched fallback CSFB;

a generating unit, configured to generate a first notification message according to the request message received by the receiving unit, where the first notification message is used to instruct the eNB to move the UE from the LTE network to a 2G or 3G network for the CSFB; and a sending unit, configured to send, to the evolved NodeB eNB, the first notification message generated by the generating unit; where the receiving unit is further configured to receive a handover requirement message sent by the eNB;

the generating unit is further configured to generate a first handover request message according to the handover requirement message received by the receiving unit, where the first handover request message is used to request the MSC to hand over the UE from the LTE network to a circuit switched CS domain of the 2G or 3G network for the CSFB;

the sending unit is further configured to send, to the mobile switching center MSC, the first handover request message generated by the generating unit;

the receiving unit is further configured to receive a first handover request response message sent by the MSC, where the first handover request response message includes a radio access bearer RAB, and the RAB is a RAB whose domain identifier is a packet switched PS domain, or the RAB is a PS RAB;

the generating unit is further configured to generate a handover requirement response message according to the first handover request response message received by the receiving unit, where the handover requirement response message includes the RAB; and the sending unit is further configured to send, to the eNB, the handover requirement response message generated by the generating unit, so that the RAB is sent by the eNB to the UE.

With reference to the fifth aspect, in a first possible implementation manner, the first handover request message includes first indication information, where the first indication information is used to request the MSC to hand over the UE from the LTE network to the CS domain of the 2G or 3G network for the CSFB; or the first indication information is used to request the MSC to hand over the UE from the LTE network to the CS domain of the 2G or 3G network for the CSFB and is used to indicate that the UE supports handover from the LTE network to a PS domain of the 2G or 3G network.

With reference to the fifth aspect or the first possible implementation manner of the fifth aspect, in a second possible implementation manner, the handover requirement message includes second indication information, where the second indication information is used to instruct the MME to hand over the UE from the LTE network to the CS domain of the 2G or 3G network for the CSFB; or the second indication information is used to request the MME to hand over the UE from the LTE network to the CS domain of the 2G or 3G network for the CSFB and is used to indicate that the UE supports the handover from the LTE network to the PS domain of the 2G or 3G network.

With reference to the fifth aspect or the first or second possible implementation manner of the fifth aspect, in a third possible implementation manner, the first notification message includes third indication information, where the third indication information is used to indicate that the LTE network and the 2G or 3G network support the handover of the UE from the LTE network to the CS domain of the 2G or 3G network for the CSFB.

With reference to the third possible implementation manner of the fifth aspect, in a fourth possible implementation manner, the third indication information is used to indicate that the LTE network and the 2G or 3G network support single radio voice call continuity SRVCC handover in the handover of the UE from the LTE network to the 2G or 3G network for the CSFB.

With reference to the fifth aspect or any possible implementation manner of the first to fourth possible implementation manners of the fifth aspect, in a fifth possible implementation manner, the handover requirement message is a message of requiring the handover from the LTE network to the PS domain of the 2G or 3G network, a message of requiring the handover from the LTE network to the CS domain of the 2G or 3G network, or a message of requiring handover from the LTE network to the PS domain and the CS domain of the 2G or 3G network.

A sixth aspect of the present invention provides a mobile switching center MSC, including:

a receiving unit, configured to receive a first handover request message sent by a mobility management entity MME, where the first handover request message is used to request the MSC to hand over user equipment UE from a Long Term Evolution LTE network to a circuit switched CS domain of a 2G or 3G network for circuit switched fallback CSFB;

a generating unit, configured to generate a second handover request message according to the first handover request message received by the receiving unit, where the second handover request message is used to request a base station of the 2G or 3G network to hand over the UE from the LTE network to the CS domain of the 2G or 3G network; and a sending unit, configured to send, to the base station, the second handover request message generated by the generating unit; where the receiving unit is further configured to receive a second handover request acknowledgement message sent by the base station, where the second handover request acknowledgement message includes a radio access bearer RAB, and the RAB is a RAB whose domain identifier is a packet switched PS domain, or the RAB is a PS RAB;

the generating unit is further configured to generate a first handover request response message according to the second handover request acknowledgement message received by the receiving unit, where the first handover request response message includes the RAB; and a sending unit is further configured to send, to the MME, the first handover request response message generated by the generating unit.

With reference to the sixth aspect, in a first possible implementation manner, the second handover request message includes fourth indication information, where the fourth indication information is used to request the base station to hand over the UE from the LTE network to the CS domain of the 2G or 3G network for the CSFB; or the fourth indication information is used to request the base station to hand over the UE from the LTE network to the CS domain of the 2G or 3G network for the CSFB and is used to indicate that the UE supports handover from the LTE network to a PS domain of the 2G or 3G network.

With reference to the sixth aspect or the first possible implementation manner of the sixth aspect, in a second possible implementation manner, the first handover request message includes first indication information, where the first indication information is used to request the MSC to hand over the UE from the LTE network to the CS domain of the 2G or 3G network for the CSFB; or the first indication information is used to request the MSC to hand over the UE from the LTE network to the CS domain of the 2G or 3G network for the CSFB and is used to indicate that the UE supports the handover from the LTE network to the PS domain of the 2G or 3G network.

With reference to the sixth aspect or the first or second possible implementation manner of the sixth aspect, in a third possible implementation manner, the receiving unit is further configured to receive a first CS call connection request message sent by the UE, where the first CS call connection request message is used to request the MSC to generate a first session for the UE; or the sending unit is further configured to send a second CS call connection request message to the UE, where the second CS call connection request message is used to request the UE to generate a second session.

With reference to the third possible implementation manner of the sixth aspect, in a fourth possible implementation manner, the receiving unit is further configured to receive at least one of the following messages: a handover complete message sent by the base station, a connection management service request message sent by the UE, the first CS call connection request message sent by the UE, and a paging response message sent by the UE; and the sending unit is further configured to send a second notification message to the base station after the receiving unit receives the at least one of the following messages or after the sending unit sends the second CS call connection request message, where the second notification message is used to request the base station to allocate a CS domain resource to the UE.

A seventh aspect of the present invention provides a base station of a 2G or 3G network, including:

a receiving unit, configured to receive a second handover request message sent by a mobile switching center MSC, where the second handover request message is used to request the base station to hand over user equipment UE from a Long Term Evolution LTE network to a circuit switched CS domain of the 2G or 3G network for circuit switched fallback CSFB;

a generating unit, configured to generate a second handover request acknowledgement message according to the second handover request message received by the receiving unit, where the second handover request acknowledgement message includes a radio access bearer RAB, and the RAB is a RAB whose domain identifier is a packet switched PS domain, or the RAB is a PS RAB;

a sending unit, configured to send, to the MSC, the second handover request acknowledgement message generated by the generating unit; and an allocating unit, configured to allocate a CS RAB to the UE according to the second handover request message received by the receiving unit; where the receiving unit is further configured to receive a handover complete message sent by the UE;

the generating unit is further configured to: generate a second notification message according to the handover complete message received by the receiving unit and send the second notification message to the UE, where the second notification message includes the CS RAB allocated by the base station to the UE; and the sending unit is further configured to send, to the UE, the second notification message generated by the generating unit.

With reference to the seventh aspect, in a first possible implementation manner, the receiving unit is further configured to receive a signaling message sent by the UE to the MSC; and the sending unit is further configured to: after the receiving unit receives the signaling message sent by the UE to the MSC, send the signaling message to the MSC by means of a connection set up in a process of the handover from the LTE network to the CS domain of the 2G or 3G network, or send the signaling message to the MSC by using a direct transmission message.

With reference to the seventh aspect or the first possible implementation manner of the seventh aspect, in a second possible implementation manner, the second handover request message includes fourth indication information, where the fourth indication information is used to request the base station to hand over the UE from the LTE network to the CS domain of the 2G or 3G network for the CSFB; or the fourth indication information is used to request the base station to hand over the UE from the LTE network to the CS domain of the 2G or 3G network for the CSFB and is used to indicate that the UE supports handover from the LTE network to a PS domain of the 2G or 3G network.

With reference to the seventh aspect or the first or second possible implementation manner of the seventh aspect, in a third possible implementation manner, the base station further includes an allocating unit, where the allocating unit is configured to allocate the CS RAB to the UE before the second handover request acknowledgement message is sent to the MSC, where the second handover request acknowledgement message does not include the CS RAB, or the allocating unit is configured to allocate the CS RAB to the UE after the second handover request acknowledgement message is sent to the MSC.

With reference to the seventh aspect or any one of the first to third possible implementation manners of the seventh aspect, in a fourth possible implementation manner, the receiving unit is further configured to: receive a call setup message or a call acknowledgement message sent by the UE, or receive a call proceeding message sent by the MSC, and the sending unit is further configured to send the second notification message to the UE after the receiving unit receives the call setup message or the call acknowledgement message sent by the UE, or after the receiving unit receives the call proceeding message sent by the MSC.

With reference to the seventh aspect or any one of the first to fourth possible implementation manners of the seventh aspect, in a fifth possible implementation manner, the sending unit is further configured to: send universal mobile telecommunications system terrestrial radio access network UTRAN mobility information to the UE, where the UTRAN mobility information does not include a location area identity LAI; and send the LAI to the UE after a preset time.

With reference to the seventh aspect or any one of the first to fourth possible implementation manners of the seventh aspect, in a sixth possible implementation manner, the sending unit is further configured to: send universal mobile telecommunications system terrestrial radio access network UTRAN mobility information to the UE, where the UTRAN mobility information does not include a location area identity LAI;

the receiving unit is further configured to receive a call release command sent by the MSC, a call connection success message sent by the MSC, or a call connection success message sent by the UE; and the sending unit is further configured to send the LAI to the UE after the receiving unit receives the call release command or the call connection success message.

With reference to the seventh aspect or any one of the first to sixth possible implementation manners of the seventh aspect, in a seventh possible implementation manner, the receiving unit is further configured to receive a call release message sent by the MSC; and the base station further includes a redirecting unit or a handover unit, where the redirecting unit is configured to redirect the UE to the LTE network according to the call release message received by the receiving unit; or the handover unit is configured to hand over the UE to the LTE network according to the call release message received by the receiving unit.

With reference to the seventh aspect or any one of the first to seventh possible implementation manners of the seventh aspect, in an eighth possible implementation manner, the receiving unit is further configured to: receive a location update request message sent by the UE, and determine skipping sending the location update request message to the MSC; and the sending unit is further configured to send a location update accept message to the UE.

An eighth aspect of the present invention provides an evolved NodeB eNB, including:

a receiving unit, configured to receive a first notification message sent by a mobility management entity MME, where the first notification message is used to instruct the eNB to move user equipment UE from a Long Term Evolution LTE network to a 2G or 3G network for circuit switched fallback CSFB;

a generating unit, configured to generate a handover requirement message according to the first notification message received by the receiving unit, where the handover requirement message is a message of requiring handover from the LTE network to a circuit switched CS domain of the 2G or 3G network; and a sending unit, configured to send, to the MME, the handover requirement message generated by the generating unit; where the receiving unit is further configured to receive a handover requirement response message sent by the MME, where the handover requirement response message includes a radio access bearer RAB, and the RAB is a RAB whose domain identifier is a packet switched PS domain, or the RAB is a PS RAB;

the generating unit is further configured to generate a handover command according to the handover requirement response message received by the receiving unit, where the handover command includes the RAB; and the sending unit is further configured to send, to the UE, the handover command generated by the generating unit.

With reference to the eighth aspect, in a first possible implementation manner, the first notification message is further used to indicate that the LTE network and the 2G or 3G network support the handover of the UE from the LTE network to the CS domain of the 2G or 3G network for the CSFB.

With reference to the eighth aspect or the first possible implementation manner of the eighth aspect, in a second possible implementation manner, the handover requirement message includes second indication information, where the second indication information is used to request the MME to hand over the UE from the LTE network to the CS domain of the 2G or 3G network for the CSFB; or the second indication information is used to request the MME to hand over the UE from the LTE network to the CS domain of the 2G or 3G network for the CSFB and is used to indicate that the UE supports handover from the LTE network to a PS domain of the 2G or 3G network; or a source-to-target container in the handover requirement message includes fifth indication information, where the fifth indication information is used to request a base station of the 2G or 3G network to hand over the UE from the LTE network to the CS domain of the 2G or 3G network for the CSFB; or a source-to-target container in the handover requirement message includes fifth indication information, where the fifth indication information is used to request a base station of the 2G or 3G network to hand over the UE from the LTE network to the CS domain of the 2G or 3G network for the CSFB and is used to indicate that the UE supports handover from the LTE network to a PS domain of the 2G or 3G network.

With reference to the eighth aspect or the first possible implementation manner of the eighth aspect, in a third possible implementation manner, the handover requirement message includes UE capability information, so that a first handover request message sent by the MME to a mobile switching center MSC includes the UE capability information.

With reference to the eighth aspect or any one of the first to third possible implementation manners of the eighth aspect, in a fourth possible implementation manner, the evolved NodeB further includes:

a determining unit, configured to: before the sending unit sends the handover requirement message to the MME, determine that the UE supports the handover from the LTE network to the PS domain of the 2G or 3G network; and/or before the sending unit sends the handover command to the UE, determine that the UE supports the handover from the LTE network to the PS domain of the 2G or 3G network.

A ninth aspect of the present invention provides a network handover system, including a mobility management entity, an evolved NodeB, a mobile switching center, a base station, and user equipment, where the mobility management entity is the mobility management entity according to the foregoing technical solutions;

the mobile switching center is the mobile switching center according to the foregoing technical solutions;

the base station is the base station according to the foregoing technical solutions; and the evolved NodeB is the evolved NodeB according to the foregoing technical solutions.

Compared with the prior art, in the solution provided in the embodiments of the present invention, in a process of implementing CSFB, handover from an LTE network to a CS domain of a 2G or 3G network is triggered, and a radio resource bearer for handover from the LTE network to a PS domain of the 2G or 3G network is provided for a UE, so that the UE can be handed over to the PS domain of the 2G or 3G network. After being handed over to the PS domain, the UE can perform a CS domain call. A network triggers the handover from the LTE network to the CS domain of the 2G or 3G network, so that the network can prepare a voice resource for the CS domain in advance and shorten duration of a voice call.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person skilled in the art may still derive other drawings from these accompanying drawings without creative efforts.

DETAILED DESCRIPTION

Embodiments of the present invention provide a network handover method, and in a process of implementing CSFB, handover from an LTE network to a CS domain of a 2G or 3G network is triggered, and a radio resource bearer for handover from the LTE network to a PS domain of the 2G or 3G network is provided for a UE, so that the UE can be handed over to the PS domain of the 2G or 3G network. After being handed over to the PS domain, the UE can perform a CS domain call. The embodiments of the present invention further provide corresponding devices and systems. Detailed descriptions are separately provided below.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person skilled in the art based on the embodiments of the present invention without creative efforts shall fall within the protection scope of the present invention.

Full names and abbreviations of some related communications terms in the embodiments of the present invention include: mobility management entity (MME), evolved NodeB (eNB), user equipment (UE), mobile switching center (MSC), the $2^{nd}$ generation or $3^{rd}$ generation mobile communications technologies (2G or 3G), base station (BS), Long Term Evolution (LTE), and serving GPRS support node (SGSN), where a base station in the embodiments of the present invention includes a base station controller BSC and a radio network controller (RNC).

"First", "second", "third", "fourth", and the like in the embodiments of the present invention are used only for distinguishing objects such as different indication information or different messages instead of representing an order relationship.

Figure 1A:
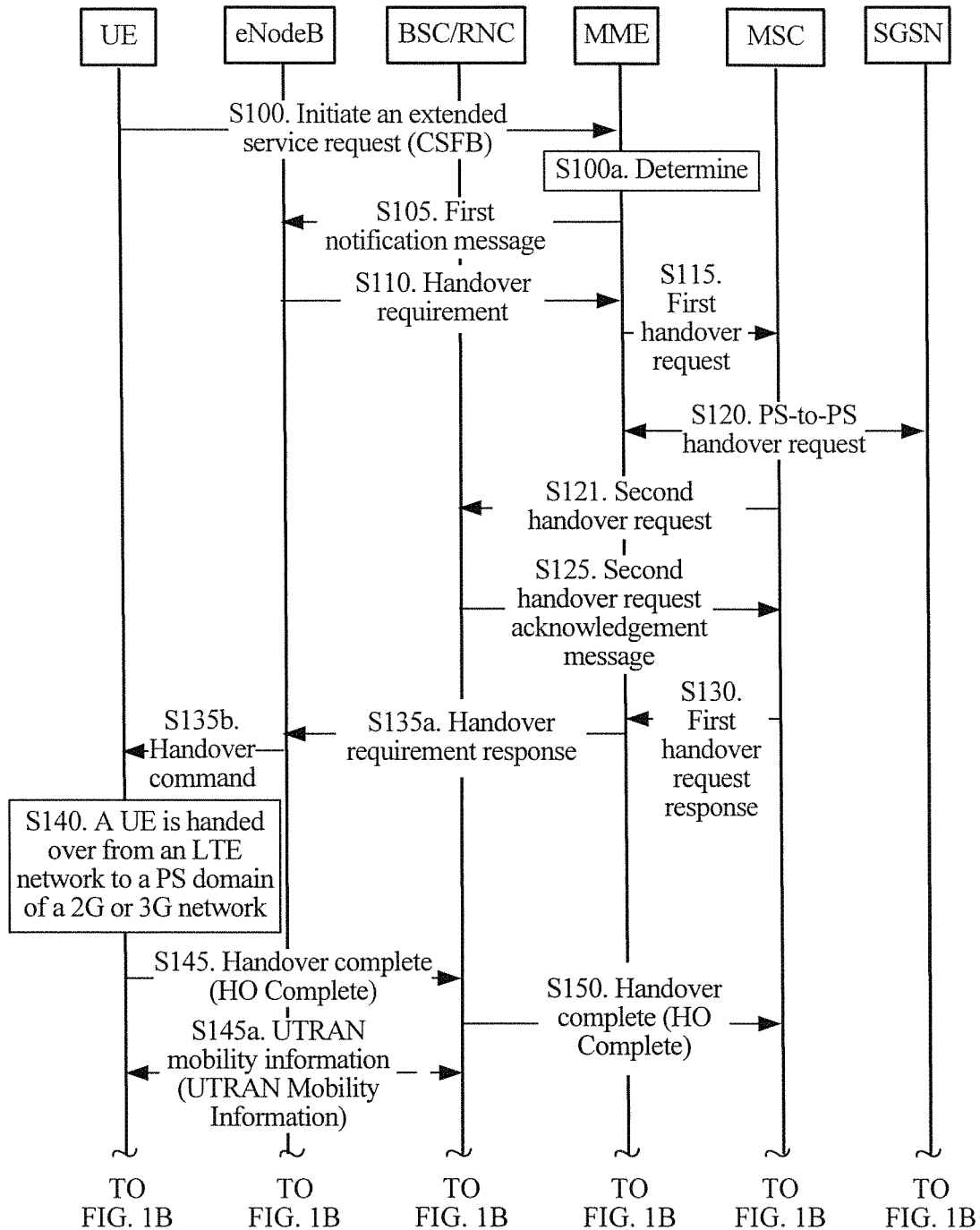
FIG. 1A and FIG. 1B are schematic diagrams of a network handover method according to an embodiment of the present invention.
Figure 1B:
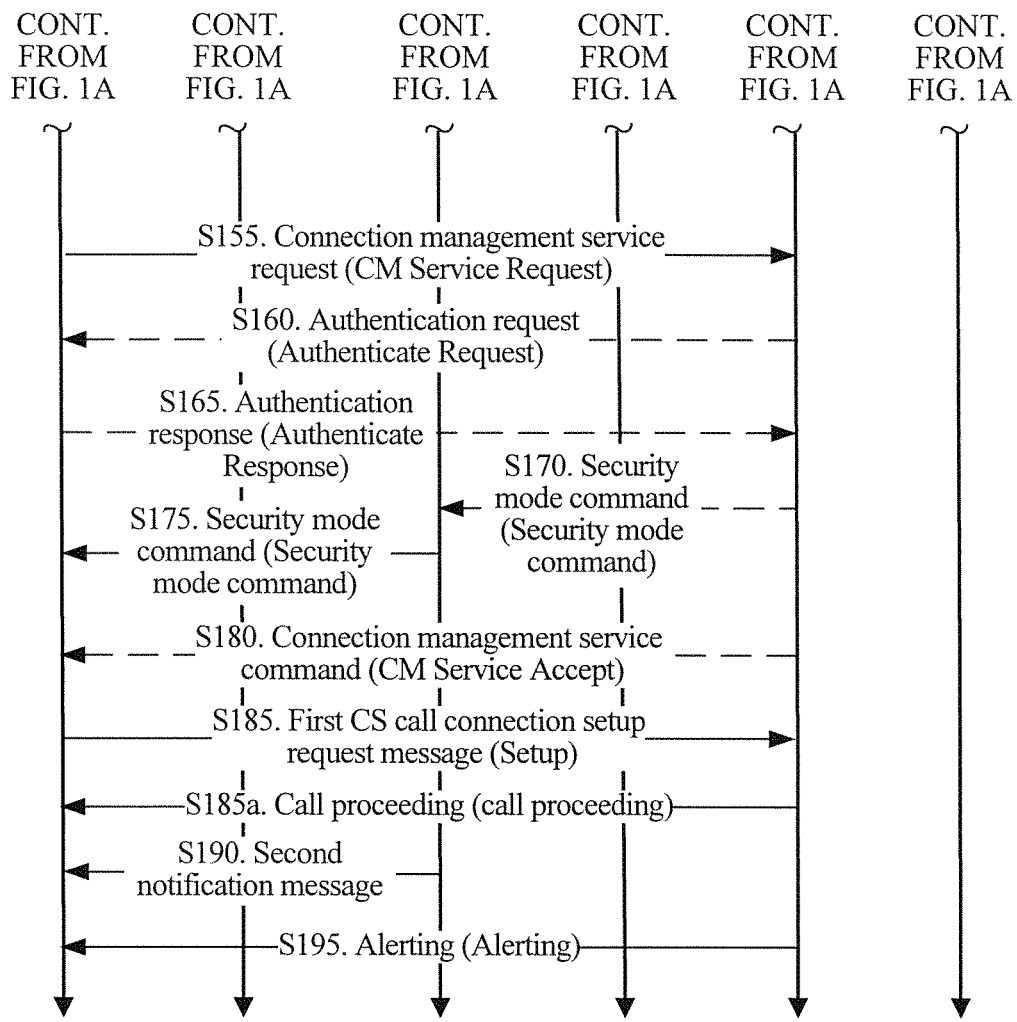

Referring to FIG. 1A and FIG. 1B, FIG. 1A and FIG. 1B show a fallback process implemented by a UE by being handed over from an LTE network to a 2G or 3G network and an active call process after handover according to an embodiment of the present invention.

S100. The UE sends an extended service request to an MME, where the extended service request is used to request circuit switched fallback CSFB.

S100a. The MME may determine whether the LTE network and the 2G or 3G network support handover of the UE from the LTE network to a CS domain of a 2G or 3G network for the CSFB.

Alternatively, the MME may perform no determining, but deem by default that a communications network supports the handover of the UE from the LTE network to the CS domain of the 2G or 3G network for the CSFB, or perform determining only on some networks.

S105. The MME sends a first notification message to an evolved NodeB eNB according to the extended service request, where the first notification message is used to instruct the evolved NodeB eNB to move the UE from the LTE network to the 2G or 3G network for the CSFB, that is, the first notification message is used to instruct the eNB that the UE should be moved to the 2G or 3G network for the CSFB.

When the MME determines that the LTE network and the 2G or 3G network support the handover of the UE from the LTE network to the CS domain of the 2G or 3G network for the CSFB, the MME may send the first notification message to inform the eNB whether the LTE network and the 2G or 3G network support the handover of the UE from the LTE network to the CS domain of the 2G or 3G network for the CSFB, so that the eNB initiates a handover requirement of handing over the UE from the LTE network to the CS domain of the 2G or 3G network for the CSFB.

For example, the first notification message may include third indication information, where the third indication information is used to indicate whether the LTE network and the 2G or 3G network support the handover of the UE from the LTE network to the CS domain of the 2G or 3G network for the CSFB.

For example, the third indication information includes a first information element and a second information element, where the first information element is used to indicate the CSFB, and the second information element is used to indicate whether the LTE network and the 2G or 3G network support the handover of the UE from the LTE network to the CS domain of the 2G or 3G network.

For example, the third indication information may be indication information indicating that the LTE network and the 2G or 3G network support single radio voice call continuity SRVCC handover in the handover of the UE from the LTE network to the 2G or 3G network for the CSFB.

The third indication information in this embodiment of the present invention may be referred to as an optimized CSFB indicator (optimized CSFB indicator), a single radio voice call continuity (SRVCC)-based CSFB indicator (SRVCC based CSFB Indicator), an enhanced CSFB indicator, an enhanced CSFB possibility indicator (enhanced CSFB possible), or an SRVCC operation possibility indicator (SRVCC Operation possible).

S110. The eNB sends a handover requirement message to the MME.

The handover requirement message may be a message of requiring handover from the LTE network to a PS domain of the 2G or 3G network, a message of requiring the handover from the LTE network to the CS domain of the 2G or 3G network, or a message of requiring handover from the LTE network to the PS domain and the CS domain of the 2G or 3G network.

The handover requirement message may include UE capability information, and is used to indicate information about a frequency band supported by the UE, an access capability, and the like. For example, the UE capability information may be at least one of a classmark 2 and a classmark 3. In the prior art, when the UE does not support the handover from the LTE network to the CS domain of the 2G or 3G network, the eNB does not send the UE capability information to the MME. Therefore, the MME does not have the UE capability information, but the MME needs to send the UE capability information to an MSC, so that the MSC can perform handover to the CS domain of the 2G or 3G network. After acquiring the UE capability information, the MME may send the UE capability information to the MSC. In this embodiment of the present invention, the UE capability information may be transmitted to the MME by using the handover request message.

The handover requirement message may include second indication information, where the second indication information instructs the MME to hand over the UE from the LTE network to the CS domain of the 2G or 3G network for the CSFB. The second indication information may further indicate that the UE supports the handover from the LTE network to the PS domain of the 2G or 3G network.

A source-to-target container in the handover requirement message may include fifth indication information, where the fifth indication information is used to request a base station of the 2G or 3G network to hand over the UE from the LTE network to the CS domain of the 2G or 3G network for the CSFB. The fifth indication information may further indicate that the UE supports the handover from the LTE network to the PS domain of the 2G or 3G network.

When the second indication information does not indicate that the UE supports the handover from the LTE network to the PS domain of the 2G or 3G network, the MME may deem by default that the UE supports the handover. When the fifth indication information does not indicate that the UE supports the handover from the LTE network to the PS domain of the 2G or 3G network, the base station may deem by default that the UE supports the handover. The second indication information and the fifth indication information may be referred to as a CSFB indicator, an optimized CSFB indicator, an SRVCC-based CSFB indicator, an enhanced CSFB indicator, or an enhanced CSFB possibility indicator.

For example, the second indication information may include a CSFB indication field, or a CSFB indication field and a UE capability field. The CSFB indication field instructs the MME to hand over the UE from the LTE network to the circuit switched CS domain of the 2G or 3G network for the CSFB. The UE capability field indicates that the UE supports the handover from the LTE network to the PS domain of the 2G or 3G network.

For example, the fifth indication information may include a CSFB indication field, or a CSFB indication field and a UE capability field. The CSFB indication field instructs the base station of the 2G or 3G network to hand over the UE from the LTE network to the circuit switched CS domain of the 2G or 3G network for the CSFB. The UE capability field indicates that the UE supports the handover from the LTE network to the PS domain of the 2G or 3G network.

For example, (a) if a target network is a UTRAN network, the eNB includes the fifth indication information in a source RNC to target RNC transparent container, where a CSFB information field in an existing source RNC to target RNC transparent container may be used as the CSFB indication field, and a field may be added in the source RNC to target RNC transparent container to be used as the UE capability field;

(b) if a target network is a GERAN network, the eNB includes the fifth indication information in old BSS to new BSS information, where the CSFB indication field or the UE capability field may be added in the old BSS to new BSS information.

S115. The MME sends a first handover request message to an MSC.

Because the first handover request message is sent by the MME to the MSC, handover required by the first handover request message is the handover from the LTE network to the CS domain of the 2G or 3G network, that is, the first handover request message is a PS-to-CS handover request.

After receiving the first handover request message, the MSC may prepare a CS voice resource and send a second handover request message to instruct the base station of the 2G or 3G network to prepare the CS voice resource.

The first handover request message may include first indication information, where the first indication information is used to request the MSC to hand over the UE from the Long Term Evolution LTE network to the circuit switched CS domain of the 2G or 3G network for the CSFB, that is, the first indication information is used to indicate that the first handover request is sent for the CSFB. The first indication information may further indicate that the UE supports the handover from the LTE network to the PS domain of the 2G or 3G network, or the first handover request message may not indicate the CSFB, and in this case, the MSC deems by default that the first handover request is sent for the CSFB.

After the MME receives the UE capability information from the eNB, the first handover request message may include the UE capability information, so that the MSC can perform handover to the CS domain of the 2G or 3G. For example, the UE capability information is at least one of a classmark 2 and a classmark 3. Because the UE does not support the handover from the LTE network to the CS domain of the 2G or 3G network, the UE does not report voice coding/decoding information supported by the UE. In this case, the MME may include default coding/decoding information in the first handover request message according to a target system of handover.

The first indication information in the first handover request message may be referred to as a CSFB indicator, an optimized CSFB indicator, a single radio voice call continuity (single radio voice call continuity, SRVCC)-based CSFB indicator (SRVCC based CSFB Indicator), an enhanced CSFB indicator (enhanced CSFB indicator), or an enhanced CSFB possibility indicator (enhanced CSFB possible).

Because an STN-SR is used for voice handover between an IP multimedia subsystem and the circuit domain of the 2G or 3G network, and this embodiment of the present invention relates to the circuit switched fallback, when the first handover request message includes the session transfer number-single radio (STN-SR), the MSC ignores the STN-SR number.

S120. The MME sends a PS-to-PS handover request message to an SGSN, where the PS-to-PS handover request message is used to request the SGSN to initiate handover from the LTE network to a packet switched PS domain of the 2G or 3G network.

Step S120 is an optional step, and when a network prepares to hand over the UE from the LTE network to the CS domain, the UE may be handed over to the PS domain, or may not be handed over to the PS domain.

S121. The MSC sends a second handover request message to a base station (a BSC or an RNC) of the 2G or 3G network, where the second handover request message is used to request the base station to hand over the UE from the LTE network to the CS domain of the 2G or 3G network.

The second handover request message may include fourth indication information, where the fourth indication information is used to request the base station to hand over the UE from the LTE network to the CS domain of the 2G or 3G network for the circuit switched fallback CSFB. The fourth indication information may further indicate that the UE supports the handover from the LTE network to the PS domain of the 2G or 3G network.

S125. The base station sends a second handover request acknowledgement message to the MSC, where the second handover request acknowledgement message includes a radio access bearer RAB, and the UE is handed over, by using the RAB, from the LTE network to the PS domain of the 2G or 3G network for the CSFB.

For example, the RAB is a RAB whose domain identifier is a packet switched PS domain, or the RAB is a PS RAB. For example, the RAB is a RAB whose domain identifier is a packet switched PS domain, or the RAB may be a CS RAB. However, a domain identifier in the CS RAB is a packet switched domain. When the UE does not support the handover from the LTE network to the CS domain of the 2G or 3G network, the UE may be handed over from the LTE network to the PS domain of the 2G or 3G network by using the RAB, which means that the UE at this time has been moved to the 2G or 3G network and then the UE can initiate a CS call in the 2G or 3G network.

It should be noted that the UE may further initiate a CS supplementary service request, for example, a locating service request, or a USSD (Unstructured Supplementary Service Data, unstructured supplementary service data) service request, in the 2G or 3G networking addition to the CS call. That is, a reason for performing, by the UE, the circuit switched fallback from the LTE network may be that the UE needs to initiate a CS call or initiate a CS supplementary service request in the 2G or 3G network network. After receiving the second handover request message, the base station may generate a CS RAB. The CS RAB may be used for the CS call initiated after the UE falls back to the 2G or 3G network. However, the second handover request acknowledgement message may not include the CS RAB.

According to a UE capability information included in the fourth indication information, the base station may determine that the UE supports the handover from the LTE network to the PS domain of the 2G or 3G network. Therefore, the second handover request acknowledgement message includes a radio access bearer RAB, and the RAB is a RAB whose domain identifier is a packet switched PS domain, a PS RAB, or another RAB that can be used by the UE for the handover from the LTE network to the PS domain of the 2G or 3G network. That is, the second handover request acknowledgement message includes the RAB that can be used by the UE for the handover from the LTE network to the PS domain of the 2G or 3G network. The base station may deem by default that the UE supports the handover to the PS domain, so that it is not required to determine that the UE supports the handover from the LTE network to the PS domain of the 2G or 3G network.

S130. The MSC sends a first handover request response message to the MME, where the first handover request response message includes the RAB.

S135a. The MME sends a handover requirement response message to the eNB, where the handover requirement response message includes the RAB.

S135b. The eNB sends a handover command to the UE, where the handover command includes the RAB.

Optionally, before the eNB sends the handover command to the UE, the eNB determines that the UE supports the handover from the LTE network to the PS domain of the 2G or 3G network.

S140. The UE is handed over from the LTE network to the PS domain of the 2G or 3G network for the CSFB according to the RAB included in the handover command.

S145. The UE sends a handover complete message (HO Complete) to the base station after completion of the handover.

Optionally, after receiving the handover complete message, the base station may use the CS RAB generated in step S125. When no CS RAB is generated in step S125, the base station may set up a new CS RAB.

S145a. After receiving the handover complete message, to respond to the handover complete message, the base station needs to include a location area identity (LAI) in UTRAN mobility information sent to the UE, which, in this embodiment, may cause the UE to initiate a location area update (LAU), thereby leading to a failure in setting up a CS call. To avoid the failure, the UTRAN mobility information sent by the base station to the UE may not include the location area identity.

When sending the UTRAN mobility information in a subsequent process, the base station may send the LAI to the UE by using, for example, the following method:

(a) after receiving the handover complete message, the base station starts a timer, and when the timer expires, the base station sends the UTRAN mobility information, so as to send the LAI to the UE; or (b) after receiving a call release instruction (IU RELEASE COMMAND) or a call connection success message (Connect), the base station sends the UTRAN mobility information, so as to send the LAI to the UE, where for a calling party, the MSC sends the call connection success message (Connect) to the UE, and for a called party, the UE sends the call connection success message (Connect) to the MSC.

Alternatively, when the UE sends an LAU message to the base station, to avoid a failure, the base station does not send the location update request message to the MSC, but the base station directly sends a location update accept message to the UE.

S150. The base station forwards the handover complete message in step S145 to the MSC.

S155. The UE sends a connection management service request (CM Service Request) to the MSC.

S160. Optionally, the MSC sends an authentication request to the UE.

S165. Optionally, the UE sends an authentication response to the MSC.

S170. The MSC sends a security mode command to the base station, where the security mode command carries integrity protection information and/or encryption information, so that the base station sends the security mode command to the UE.

This step S170 may also be skipped, that is, the MSC does not send the security mode command to the base station.

S175. The base station sends the security mode command to the UE. Specifically, the base station executes this step according to the security mode command in step S170, or the base station executes this step after receiving the message in S145.

S180. Optionally, the MSC sends a connection management service command to the UE.

S185. The UE sends a first CS call connection setup request message to the MSC, where the first CS call connection setup request message is used to request the MSC to generate a first session.

S185a. The MSC sends a call proceeding message to the UE.

S190. The base station sends a second notification message to the UE. The UE may send a second notification response message to the base station.

To match an existing processing process of the UE to a maximum degree, reduce exceptions, and avoid a call failure, after the base station receives a call setup message sent by the UE or the call proceeding message sent by the MSC, the base station sends the second notification message to the UE, where the second notification message includes the CS RAB allocated by the base station to the UE, such as the CS RAB described in step S125 or the CS RAB described in step S145a. The second notification message may be a radio bearer setup message or a radio bearer reconfiguration message. The UE may use the CS RAB to perform a voice call.

The base station may also send the second notification message after receiving a third notification message sent by the MSC. The MSC sends the second notification message to the base station after receiving at least one of the following messages, where the second notification message is used to request the base station to allocate a CS domain resource to the UE.

The following messages include the handover complete message sent by the base station, a connection management service request message sent by the UE, and the first CS call connection request message sent by the UE.

S195. The MSC sends an alerting message to the UE. The UE waits for an answer message from a peer end.

After the called party hooks off, the calling party and the called party enter a talk state.

When the call ends, because the call is triggered by the CSFB, the UE needs to return to the LTE network after the call is completed. According to the second handover request message, the base station determines that the call is triggered by the CSFB. Therefore, after receiving a call release message sent by the MSC, the base station of the 2G or 3G network redirects the UE to the LTE network or the base station hands over the UE to the LTE network, where the call release message is a release command Iu Release Command or a clear command Clear Command.

It should be noted that in this embodiment, the base station may parse CS signaling between the UE and the MSC. The base station receives a signaling message, for example, the connection management service request, the authentication response, or the first CS call connection setup request message, sent by the UE to the MSC. The base station may send the signaling message to the MSC by means of a connection set up in a process of the handover from the LTE network to the CS domain of the 2G or 3G network, or send the signaling message to the MSC by using a direct transmission message.

In this embodiment, the first indication information, the second indication information, the fourth indication information, and the fifth indication information may include a CSFB indication field, or a CSFB indication field and a UE capability field. The CSFB indication field instructs the MME, the MSC, or the base station of the 2G or 3G network to hand over the UE from the LTE network to the circuit switched CS domain of the 2G or 3G network for the CSFB. The UE capability field indicates that the UE supports the handover from the LTE network to the PS domain of the 2G or 3G network.

Compared with the prior art, in the method provided in this embodiment of the present invention, in a process of handover from an LTE network to a CS domain of a 2G or 3G network, a radio resource bearer for handover from the LTE network to a PS domain of the 2G or 3G network is provided for a UE, so that the UE can be handed over to the PS domain of the 2G or 3G network. A network triggers the handover from the LTE network to the CS domain of the 2G or 3G network, so that the network can prepare a voice resource for the CS domain in advance and shorten duration of a voice call.

Figure 2A:
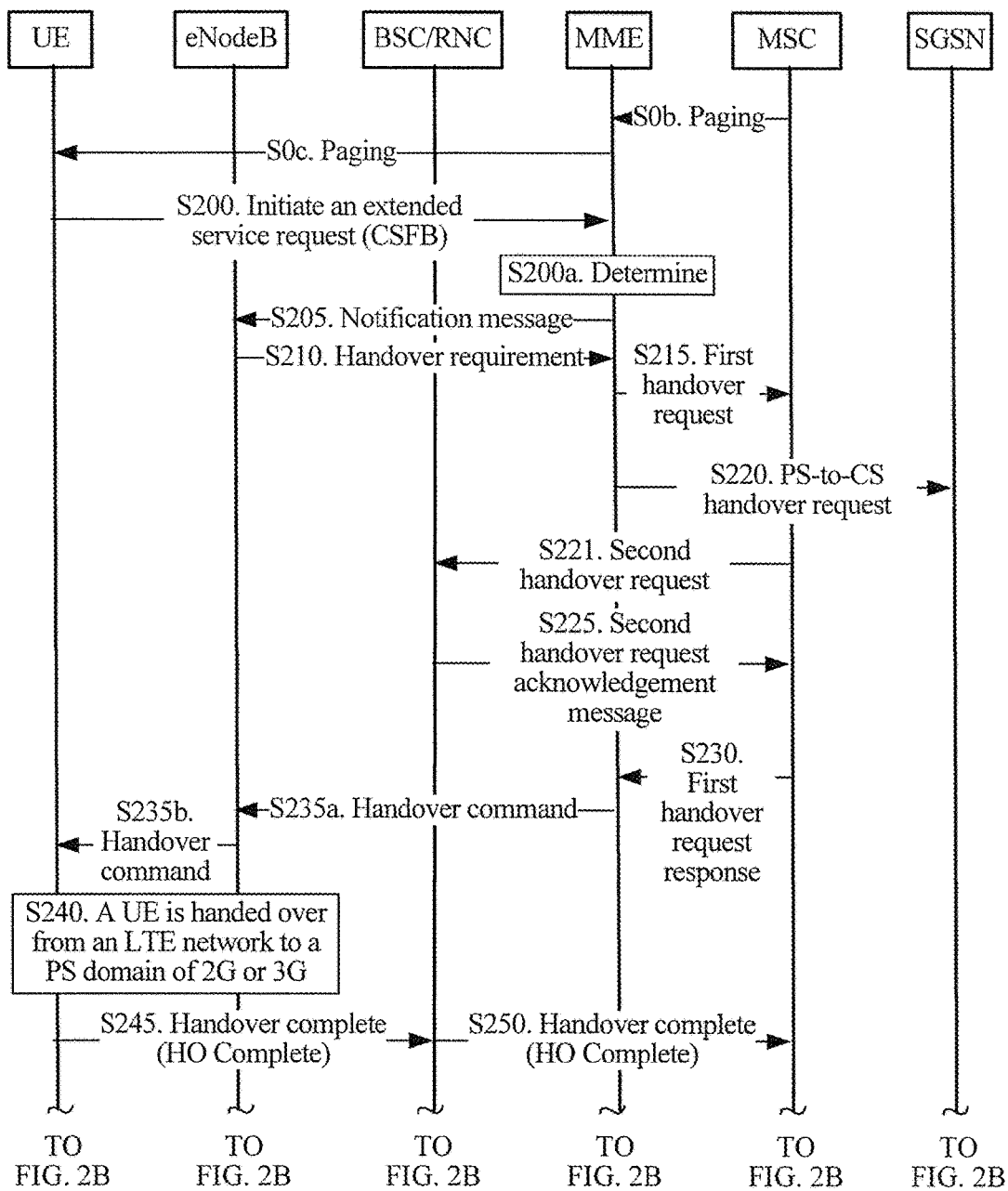
FIG. 2A and FIG. 2B are schematic diagrams of a network handover method according to an embodiment of the present invention.
Figure 2B:
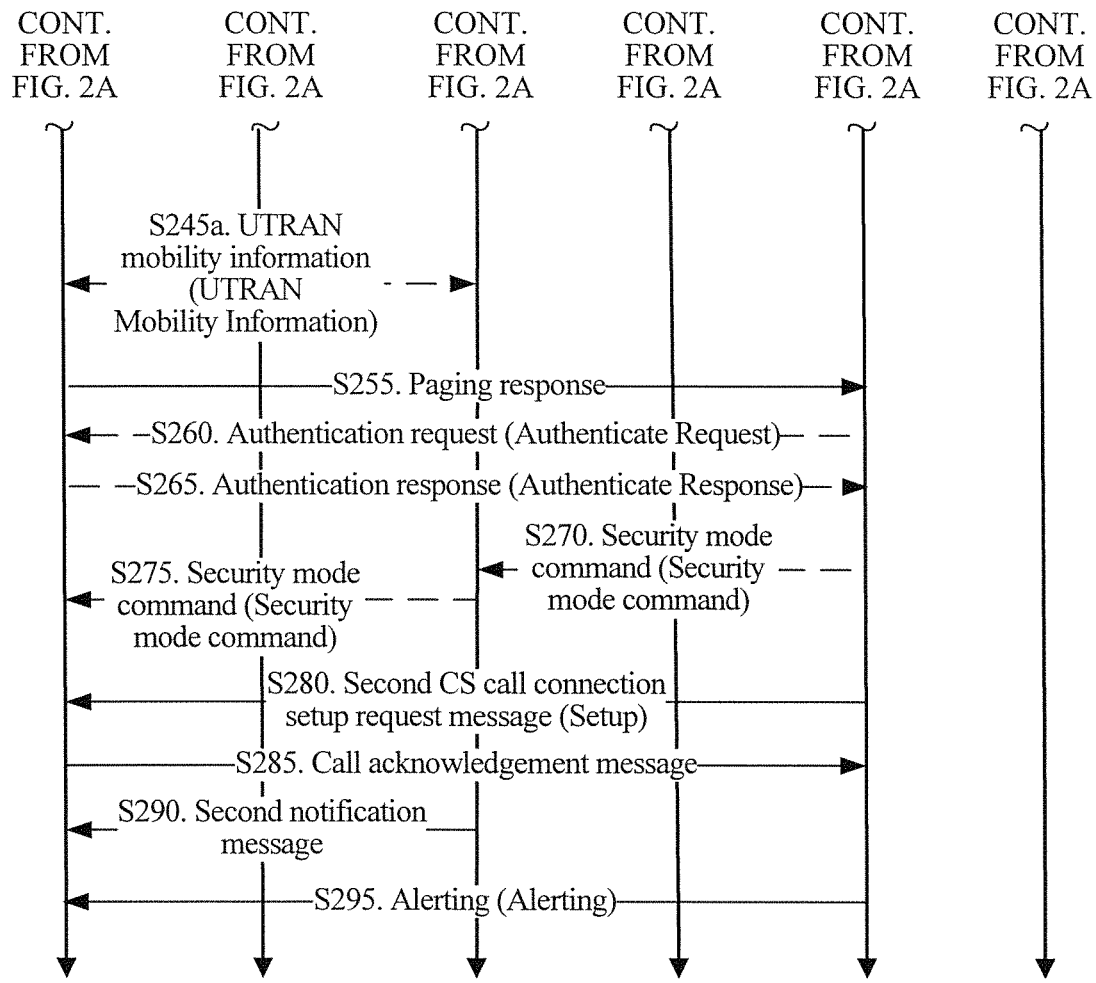

Referring to FIG. 2A and FIG. 2B, FIG. 2A and FIG. 2B show a network handover process and a passive call process after network handover according to an embodiment of the present invention.

S0b and S0c: An MSC sends a CS paging request to an MME, and the MME triggers paging.

Steps S200 to S250 are the same as steps S100 to S150 in FIG. 1A and FIG. 1B, and details are not described herein again.

S255. The UE sends a paging response to the MSC.

S260. Optionally, the MSC sends an authentication request to the UE.

S265. Optionally, the UE sends an authentication response to the MSC.

S270. The MSC sends a security mode command to the base station, where the security mode command carries integrity protection information and/or encryption information, so that the base station sends the security mode command to the UE.

Step S270 may also be skipped, that is, the MSC does not send the security mode command to the base station.

S275. The base station sends the security mode command to the UE. Specifically, the base station executes this step according to the security mode command in step S270, or the base station executes this step after receiving the message in S245.

S280. The MSC sends a second CS call connection setup request message to the UE, where the second CS call connection setup request message is used to request the UE to generate a second session.

It should be noted that the MSC may further initiate a CS supplementary service request, for example, a locating service request, or a USSD (unstructured supplementary service data) service request, to the UE in the 2G or 3G network in addition to the CS call. That is, a reason for performing, by the UE, the circuit switched fallback from the LTE network may be that the MSC needs to initiate a CS call or initiate a CS supplementary service request in the 2G or 3G network.

S285. The MSC receives a call acknowledgement message sent by the UE.

S290. The base station sends a second notification message to the UE. The UE may send a second notification response message to the base station.

To match an existing processing process of the UE to a maximum degree, reduce exceptions, and avoid a call failure, after the base station receives a call setup message sent by the MSC or the call acknowledgement message sent by the UE, the base station sends the second notification message to the UE, where the second notification message includes the CS RAB allocated by the base station to the UE, such as the CS RAB described in step S225 or the CS RAB described in step S245a. The second notification message may be a radio bearer setup message or a radio bearer reconfiguration message. The UE may use the CS RAB to perform a voice call.

The base station may also send the second notification message after receiving a third notification message sent by the MSC. The MSC sends the second notification message to the base station after receiving at least one of the following messages, where the second notification message is used to request the base station to allocate a CS domain resource to the UE.

The following messages include the handover complete message sent by the base station, the paging response sent by the UE, and the second CS call connection request message sent by the MSC.

S295. The MSC sends an alerting message to the UE.

The UE hooks off to enter a talk state.

When the call ends, because the call is triggered by the CSFB, the UE needs to return to the LTE network after the call is completed. According to the second handover request message, the base station determines that the call is triggered by the CSFB. Therefore, after receiving a call release message sent by the MSC, the base station of the 2G or 3G network redirects the UE to the LTE network or the base station hands over the UE to the LTE network, where the call release message is a release command Iu Release Command or a clear command Clear Command.

It should be noted that in this embodiment, the base station may parse CS signaling between the UE and the MSC. The base station receives a signaling message, for example, the call acknowledgement message, the authentication response, and the second CS call connection setup request message, sent by the UE to the MSC. The base station may send the signaling message to the MSC by means of a connection set up in a process of the handover from the LTE network to the CS domain of the 2G or 3G network, or send the signaling message to the MSC by using a direct transmission message.

In this embodiment, the first indication information, the second indication information, and the fourth indication information may include a CSFB indication field, or a CSFB indication field and a UE capability field. The CSFB indication field instructs the MME to hand over the UE from the LTE network to the circuit switched CS domain of the 2G or 3G network for the CSFB. The UE capability field indicates that the UE supports the handover from the LTE network to the PS domain of the 2G or 3G network.

In the foregoing two application scenarios, an entire network handover and session process is described from two perspectives: the UE as a calling party and the UE as a called party.

Compared with the prior art, in the method provided in this embodiment of the present invention, in a process of handover from an LTE network to a CS domain of a 2G or 3G network, a radio resource bearer for handover from the LTE network to a PS domain of the 2G or 3G network is provided for a UE, so that the UE can be handed over to the PS domain of the 2G or 3G network. A network triggers the handover from the LTE network to the CS domain of the 2G or 3G network, so that the network can prepare a voice resource for the CS domain in advance and shorten duration of a voice call.

Figure 3:
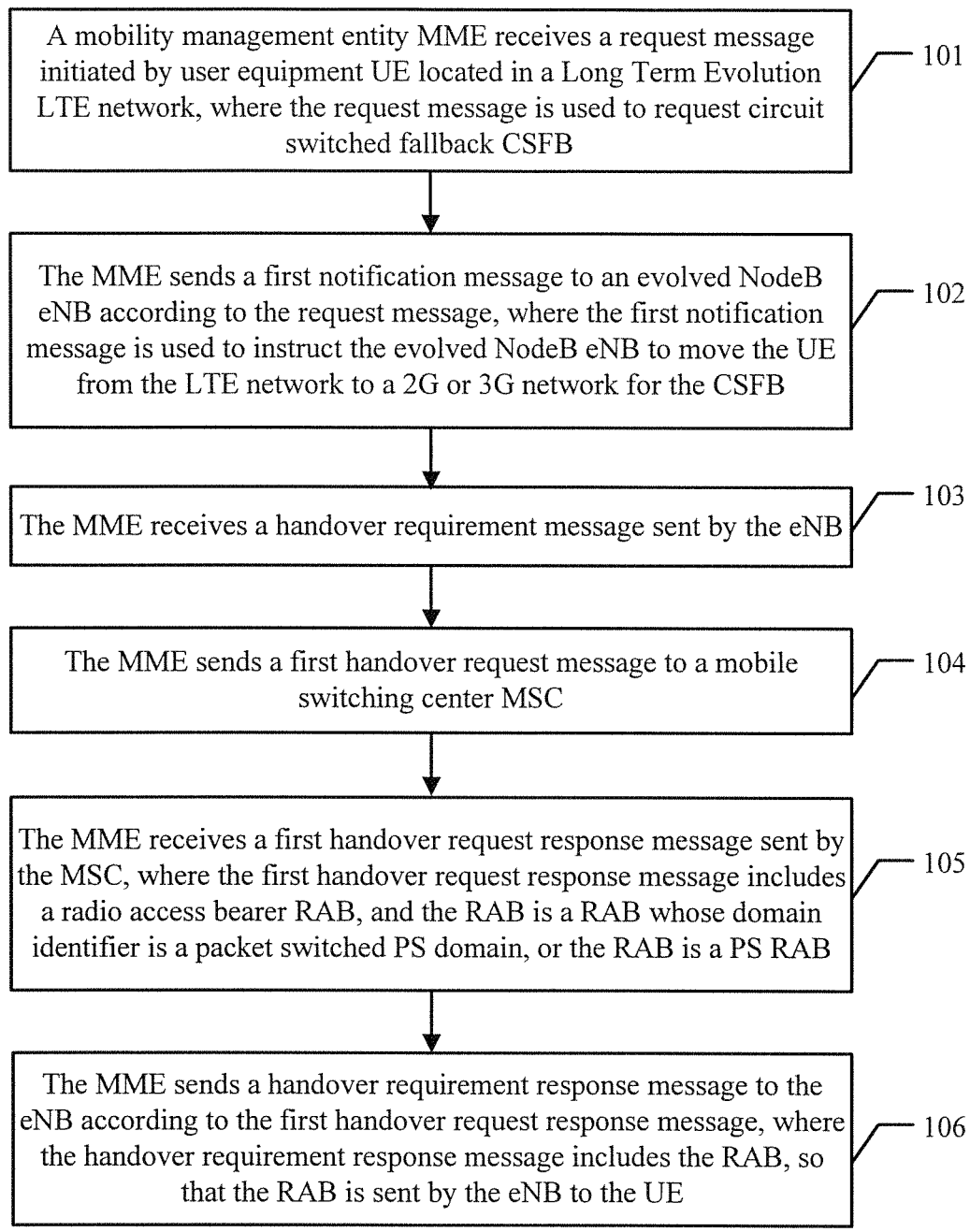
FIG. 3 is a schematic diagram of a network handover method according to an embodiment of the present invention.

Referring to FIG. 3, an embodiment of a network handover method provided in an embodiment of the present invention includes the following steps:

101. A mobility management entity MME receives a request message sent by user equipment UE located in a Long Term Evolution LTE network, where the request message is used to request circuit switched fallback CSFB. For example, the request message may be an extended service request message.

102. The MME sends a first notification message to an evolved NodeB eNB according to the request message, where the first notification message is used to instruct the evolved NodeB eNB to move the UE from the LTE network to a 2G or 3G network for the CSFB.

103. The MME receives a handover requirement message sent by the eNB.

After receiving the first notification message, the eNB learns that the UE needs to be handed over from the LTE network to the 2G or 3G network for the CSFB, and the eNB sends the handover requirement message to the MME.

104. The MME sends a first handover request message to a mobile switching center MSC.

The first handover request message is used to request the MSC to hand over the UE from the LTE network to a circuit switched CS domain of the 2G or 3G network for the CSFB.

105. The MME receives a first handover request response message sent by the MSC, where the first handover request response message includes a radio access bearer RAB, and the RAB is a RAB whose domain identifier is a packet switched PS domain, or the RAB is a PS RAB.

106. The MME sends a handover requirement response message to the eNB according to the first handover request response message, where the handover requirement response message includes the RAB, so that the RAB is sent by the eNB to the UE.

For a detailed description of the foregoing processing steps and another processing step of the MME in this embodiment, reference may be made to the description in the embodiment corresponding to FIG. 1A and FIG. 1B or FIG. 2A and FIG. 2B, and details are not described herein again.

Figure 4:
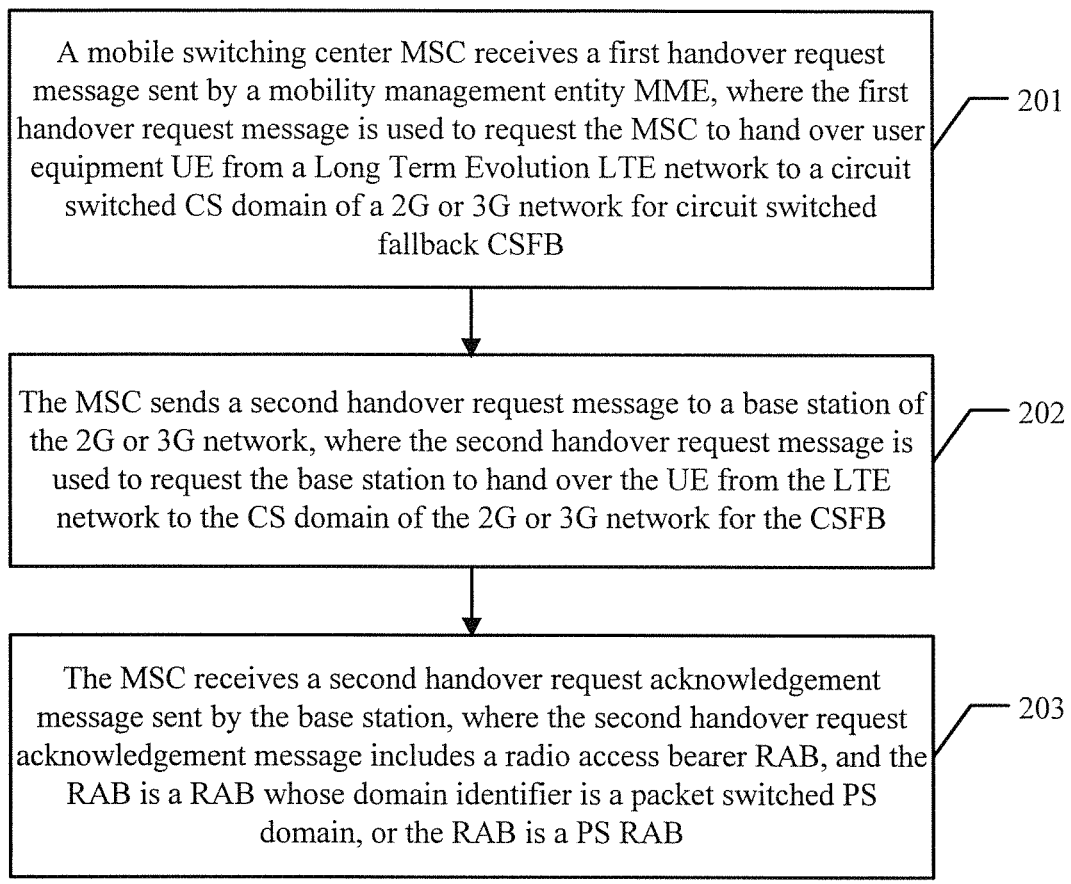
FIG. 4 is a schematic diagram of a network handover method according to an embodiment of the present invention.

Referring to FIG. 4, another embodiment of a network handover method provided in an embodiment of the present invention includes the following steps:

201. A mobile switching center MSC receives a first handover request message sent by a mobility management entity MME, where the first handover request message is used to request the MSC to hand over user equipment UE from a Long Term Evolution LTE network to a circuit switched CS domain of a 2G or 3G network for circuit switched fallback CSFB.

202. The MSC sends a second handover request message to a base station of the 2G or 3G network, where the second handover request message is used to request the base station to hand over the UE from the LTE network to the CS domain of the 2G or 3G network for the CSFB.

203. The MSC receives a second handover request acknowledgement message sent by the base station, where the second handover request acknowledgement message includes a radio access bearer RAB, and the RAB is a RAB whose domain identifier is a packet switched PS domain, the RAB is a PS RAB, or another RAB that can be used by the UE for the handover from the LTE network to a PS domain of the 2G or 3G network. From a perspective of the UE, handover to the PS domain of the 2G or 3G network is determined according to the RAB, so that the UE is handed over to the 2G or 3G network and then a CS domain call may be processed.

The MSC may send a second notification message to the base station after receiving at least one of the following messages or after sending a second CS call connection request message, where the second notification message is used to request the base station to allocate a CS domain resource to the UE, and the at least one of the following messages includes a handover complete message sent by the base station, a connection management service request message sent by the UE, a first CS call connection request message sent by the UE, and a paging response message sent by the UE.

For a detailed description of the foregoing processing steps and another processing step of the MSC in this embodiment, reference may be made to the description in the embodiment corresponding to FIG. 1A and FIG. 1B or FIG. 2A and FIG. 2B, and details are not described herein again.

Figure 5:
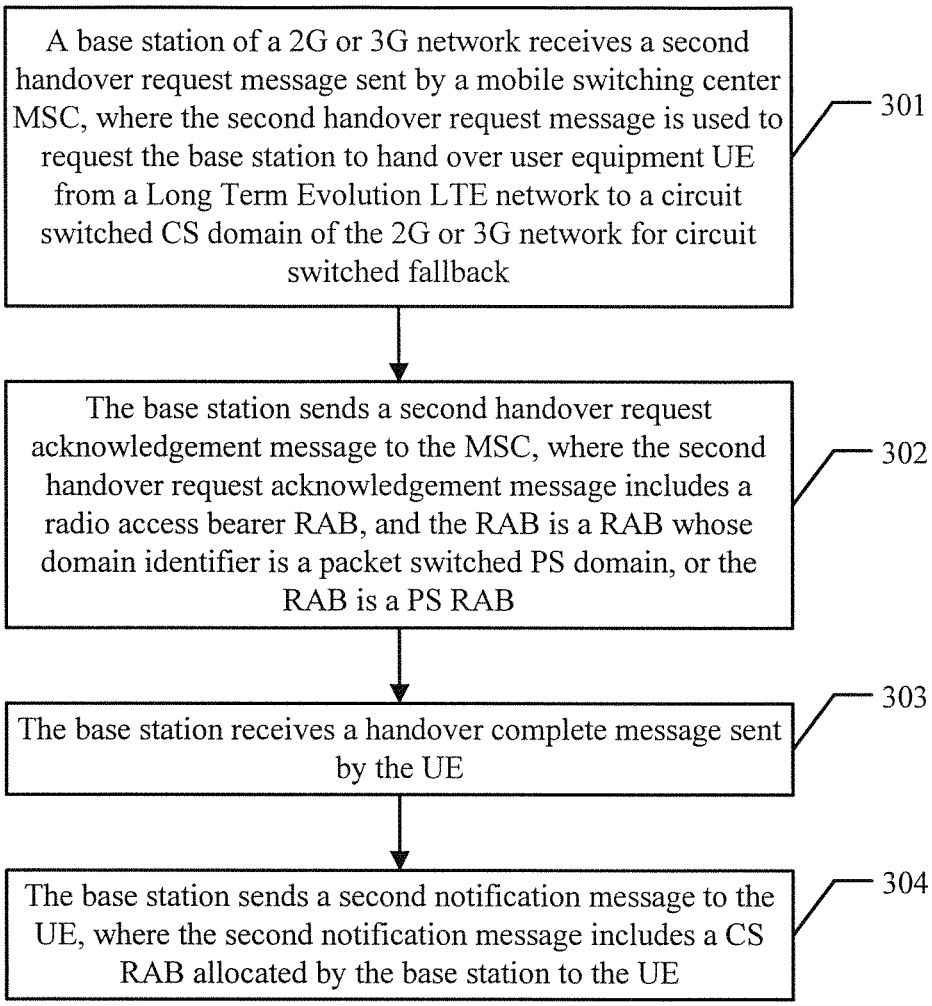
FIG. 5 is a schematic diagram of a network handover method according to an embodiment of the present invention.

Referring to FIG. 5, another embodiment of a network handover method provided in an embodiment of the present invention includes the following steps:

301. A base station of a 2G or 3G network receives a second handover request message sent by a mobile switching center MSC, where the second handover request message is used to request the base station to hand over user equipment UE from a Long Term Evolution LTE network to a circuit switched CS domain of the 2G or 3G network for circuit switched fallback.

302. The base station sends a second handover request acknowledgement message to the MSC, where the second handover request acknowledgement message includes a radio access bearer RAB, and the RAB is a RAB whose domain identifier is a packet switched PS domain, or the RAB is a PS RAB.

303. The base station receives a handover complete message sent by the UE.

304. The base station sends a second notification message to the UE, where the second notification message includes a CS RAB allocated by the base station to the UE.

For a detailed description of the foregoing processing steps and another processing step of the base station in this embodiment, reference may be made to the description in the embodiment corresponding to FIG. 1A and FIG. 1B or FIG. 2A and FIG. 2B, and details are not described herein again.

Figure 6:
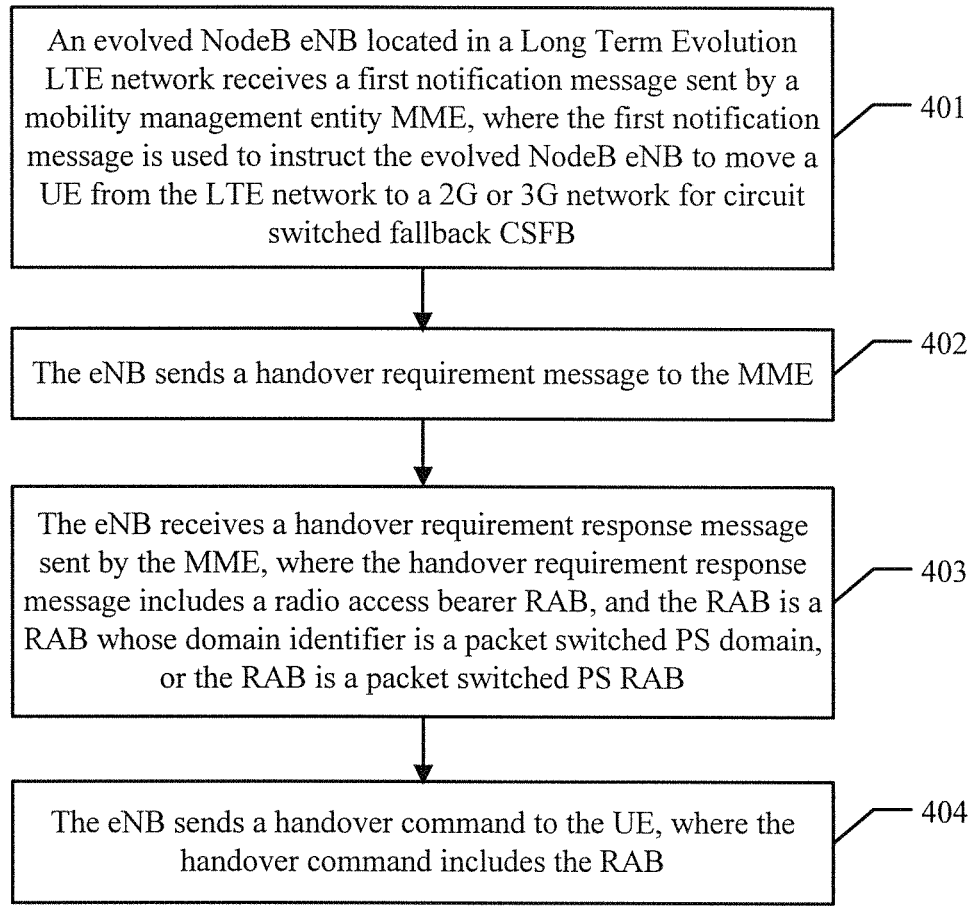
FIG. 6 is a schematic diagram of a network handover method according to an embodiment of the present invention.

Referring to FIG. 6, another embodiment of a network handover method provided in an embodiment of the present invention includes the following steps:

401. An evolved NodeB eNB located in a Long Term Evolution LTE network receives a first notification message sent by a mobility management entity MME, where the first notification message is used to instruct the evolved NodeB eNB to move a UE from the LTE network to a 2G or 3G network for circuit switched fallback CSFB.

402. The eNB sends a handover requirement message to the MME.

The handover requirement message is a message of requiring handover from the LTE network to a circuit switched CS domain of the 2G or 3G network.

403. The eNB receives a handover requirement response message sent by the MME, where the handover requirement response message includes a radio access bearer RAB, and the RAB is a RAB whose domain identifier is a packet switched PS domain, or the RAB is a packet switched PS RAB.

404. The eNB sends a handover command to the UE, where the handover command includes the RAB.

For a description of the foregoing processing steps and another processing step of the evolved NodeB in this embodiment, reference may be made to the description in the embodiment corresponding to FIG. 1A and FIG. 1B or FIG. 2A and FIG. 2B, and details are not described herein again.

Figure 7:
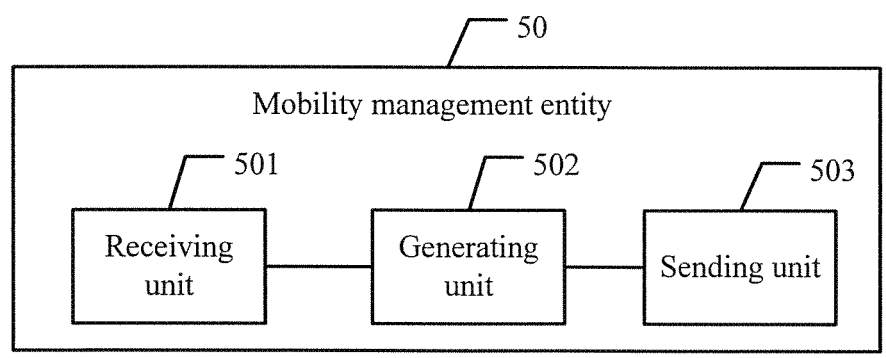
FIG. 7 is a schematic diagram of a mobility management entity according to an embodiment of the present invention.

Referring to FIG. 7, a mobility management entity 50 provided in an embodiment of the present invention includes: a receiving unit 501, a generating unit 502, and a sending unit 503.

The receiving unit 501 is configured to receive a request message sent by user equipment UE located in a Long Term Evolution LTE network, where the request message is used to request circuit switched fallback CSFB. For example, the request message may be an extended service request message.

The generating unit 502 is configured to generate a first notification message according to the request message received by the receiving unit 501, where the first notification message is used to instruct an eNB to move the UE from the LTE network to a 2G or 3G network for the CSFB.

The sending unit 503 is configured to send, to the evolved NodeB eNB, the first notification message generated by the generating unit 502.

The receiving unit 501 is further configured to receive a handover requirement message sent by the eNB.

The generating unit 502 is further configured to generate a first handover request message according to the handover requirement message received by the receiving unit 501, where the first handover request message is used to request the MSC to hand over the UE from the LTE network to a circuit switched CS domain of the 2G or 3G network for the CSFB.

The sending unit 503 is further configured to send, to the mobile switching center MSC, the first handover request message generated by the generating unit 502.

The receiving unit 501 is further configured to receive a first handover request response message sent by the MSC, where the first handover request response message includes a radio access bearer RAB, and the RAB is a RAB whose domain identifier is a packet switched PS domain, or the RAB is a PS RAB.

The generating unit 502 is further configured to generate a handover requirement response message according to the first handover request response message received by the receiving unit 501, where the handover requirement response message includes the RAB.

The sending unit 503 is further configured to send, to the eNB, the handover requirement response message generated by the generating unit 502, so that the RAB is sent by the eNB to the UE.

The mobility management entity in this embodiment can implement the method steps of the MME described in the method embodiments in FIG. 1A and FIG. 1B or FIG. 2A and FIG. 2B, and FIG. 3. A person skilled in the art may understand an action and an executed action of each unit in the MME and an relationship between the units according to the steps executed in the method embodiments.

Figure 8:
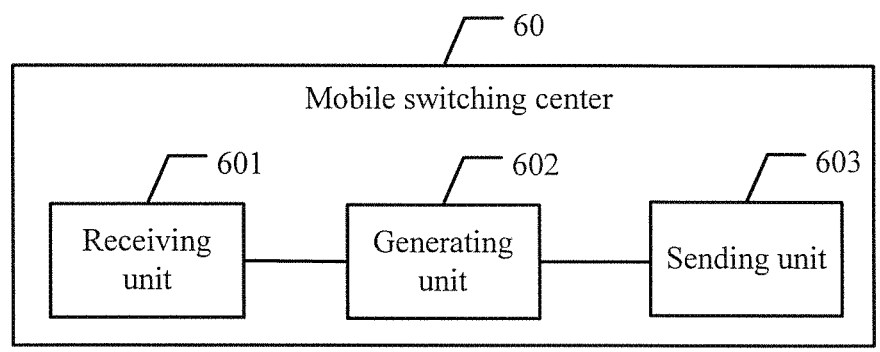
FIG. 8 is a schematic diagram of a mobile switching center according to an embodiment of the present invention.

Referring to FIG. 8, a mobile switching center MSC 60 provided in an embodiment of the present invention includes: a receiving unit 601, a generating unit 602, and a sending unit 603.

The receiving unit 601 is configured to receive a first handover request message sent by a mobility management entity MME, where the first handover request message is used to request the MSC to hand over user equipment UE from a Long Term Evolution LTE network to a circuit switched CS domain of a 2G or 3G network for circuit switched fallback CSFB.

The generating unit 602 is configured to generate a second handover request message according to the first handover request message received by the receiving unit 601, where the second handover request message is used to request a base station of the 2G or 3G network to hand over the UE from the LTE network to the CS domain of the 2G or 3G network.

The sending unit 603 is configured to send, to the base station, the second handover request message generated by the generating unit 602.

The receiving unit 601 is further configured to receive a second handover request acknowledgement message sent by the base station, where the second handover request acknowledgement message includes a radio access bearer RAB, and the RAB is a RAB whose domain identifier is a packet switched PS domain, or the RAB is a PS RAB.

The generating unit 602 is further configured to generate a first handover request response message according to the second handover request acknowledgement message received by the receiving unit, where the first handover request response message includes the RAB.

The sending unit 603 is further configured to send, to the MME, the first handover request response message generated by the generating unit.

The receiving unit 601 is further configured to receive a first CS call connection request message sent by the UE, where the first CS call connection request message is used to request the MSC to generate a first session for the UE. This is corresponding to a situation in FIG. 1A and FIG. 1B in which the UE is used as a calling party.

The sending unit 603 is further configured to send a second CS call connection request message to the UE, where the second CS call connection request message is used to request the UE to generate a second session. This is corresponding to a situation in FIG. 2A and FIG. 2B in which the UE is used as a called party.

The receiving unit 601 is further configured to receive at least one of the following messages: a handover complete message sent by the base station, a connection management service request message sent by the UE, the first CS call connection request message sent by the UE, and a paging response message sent by the UE.

The sending unit 603 is further configured to send a second notification message to the base station after the receiving unit receives the at least one of the following messages or after the sending unit 603 sends the second CS call connection request message, where the second notification message is used to request the base station to allocate a CS domain resource to the UE.

The MSC in this embodiment can implement the method steps of the MSC described in the method embodiments in FIG. 1A and FIG. 1B, FIG. 2A and FIG. 2B, and FIG. 4. A person skilled in the art may also learn an action of each unit in the MSC and a relationship between the units according to the steps executed in the method embodiments.

Figure 9:
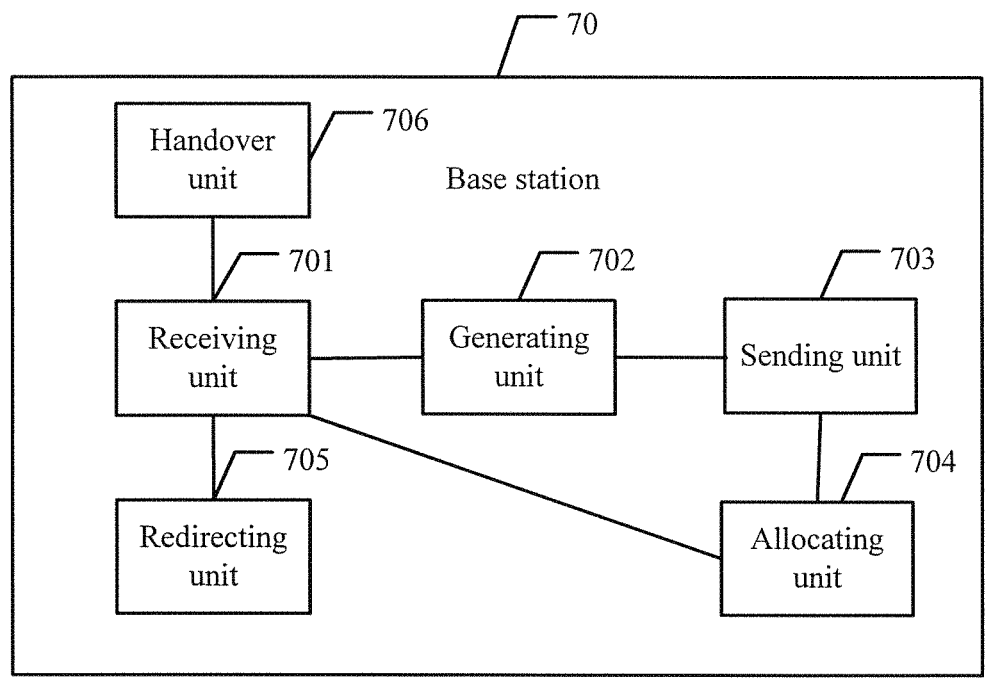
FIG. 9 is a schematic diagram of a base station according to an embodiment of the present invention.

Referring to FIG. 9, a base station 70 of a 2G or 3G network provided in an embodiment of the present invention includes: a receiving unit 701, a generating unit 702, a sending unit 703, and an allocating unit 704.

The receiving unit 701 is configured to receive a second handover request message sent by a mobile switching center MSC, where the second handover request message is used to request the base station to hand over user equipment UE from a Long Term Evolution LTE network to a circuit switched CS domain of the 2G or 3G network for circuit switched fallback CSFB.

The generating unit 702 is configured to generate a second handover request acknowledgement message according to the second handover request message received by the receiving unit, where the second handover request acknowledgement message includes a radio access bearer RAB, and the RAB is a RAB whose domain identifier is a packet switched PS domain, or the RAB is a PS RAB.

The sending unit 703 is configured to send, to the MSC, the second handover request acknowledgement message generated by the generating unit.

The allocating unit 704 is configured to allocate a CS RAB to the UE according to the second handover request message received by the receiving unit.

The receiving unit 701 is further configured to receive a handover complete message sent by the UE.

The generating unit 702 is further configured to: generate a second notification message for the UE according to the handover complete message received by the receiving unit, where the second notification message includes the CS RAB allocated by the allocating unit 704 to the UE.

The sending unit 703 is further configured to send, to the UE, the second notification message generated by the generating unit.

The receiving unit 701 is further configured to receive a signaling message sent by the UE to the MSC.

The sending unit 703 is further configured to: after the receiving unit receives the signaling message sent by the UE to the MSC, send the signaling message to the MSC by means of a connection set up in a process of the handover from the LTE network to the CS domain of the 2G or 3G network, or send the signaling message to the MSC by using a direct transmission message.

The allocating unit 704 is configured to allocate the CS RAB to the UE before the second handover request acknowledgement message is sent to the MSC, where the second handover request acknowledgement message does not include the CS RAB, or the allocating unit is configured to allocate the CS RAB to the UE after the second handover request acknowledgement message is sent to the MSC.

The receiving unit 703 is further configured to send the second notification message to the UE after the receiving unit receives the call setup message or the call acknowledgement message sent by the UE, or after the receiving unit receives a call proceeding message sent by the MSC.

The sending unit 703 is further configured to: send universal mobile telecommunications system terrestrial radio access network UTRAN mobility information to the UE, where the UTRAN mobility information does not include a location area identity LAI; and send the LAI to the UE after a preset time.

Alternatively, the sending unit 703 sends universal mobile telecommunications system terrestrial radio access network UTRAN mobility information to the UE, where the UTRAN mobility information does not include a location area identity LAI.

The receiving unit 701 is further configured to receive a call release command sent by the MSC, a call connection success message sent by the MSC, or a call connection success message sent by the UE.

The sending unit 703 is further configured to send the LAI to the UE after the receiving unit 701 receives the call release command or the call connection success message.

The receiving unit 701 is further configured to receive a call release message sent by the MSC; and the base station further includes a redirecting unit 705 or a handover unit 706, where the redirecting unit 705 is configured to redirect the UE to the LTE network according to the call release message received by the receiving unit 701; or the handover unit 706 is configured to hand over the UE to the LTE network according to the call release message received by the receiving unit 701.

The receiving unit 701 is further configured to: receive a location update request message sent by the UE, and determine skipping sending the location update request message to the MSC.

The sending unit 703 is further configured to send a location update accept message to the UE.

The base station in this embodiment can implement the method steps of the base station described in the method embodiments in FIG. 1A and FIG. 1B, FIG. 2A and FIG. 2B, and FIG. 5. A person skilled in the art may also learn an action of each unit in the base station and a relationship between the units according to the steps executed in the method embodiments.

Figure 10:
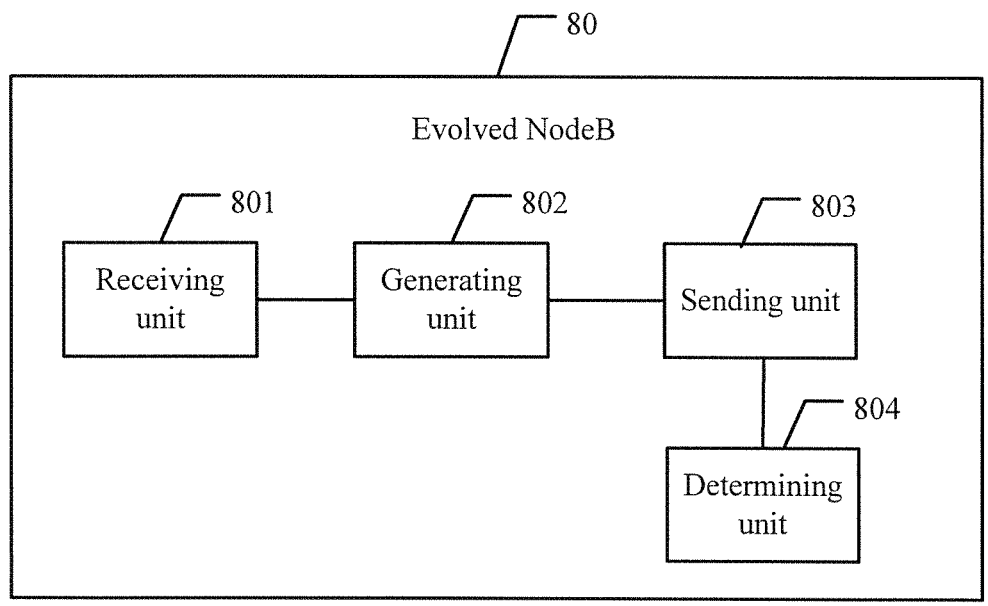
FIG. 10 is a schematic diagram of an evolved NodeB according to an embodiment of the present invention.

Referring to FIG. 10, an evolved NodeB 80 provided in an embodiment of the present invention includes: a receiving unit 801, a generating unit 802, and a sending unit 803.

The receiving unit 801 is configured to receive a first notification message sent by a mobility management entity MME, where the first notification message is used to instruct the evolved NodeB eNB to hand over user equipment UE from an LTE network to a 2G or 3G network for circuit switched fallback CSFB.

The generating unit 802 is configured to generate a handover requirement message according to the first notification message received by the receiving unit 801, where the handover requirement message is a message of requiring handover from the Long Term Evolution LTE network to a circuit switched CS domain of the 2G or 3G network.

The sending unit 803 is configured to send, to the MME, the handover requirement message generated by the generating unit 802.

The receiving unit 801 is further configured to receive a handover requirement response message sent by the MME, where the handover requirement response message includes a radio access bearer RAB, and the RAB is a RAB whose domain identifier is a packet switched PS domain, or the RAB is a PS RAB.

The generating unit 802 is further configured to generate a handover command according to the handover requirement response message received by the receiving unit 801, where the handover command includes the RAB.

The sending unit 803 is further configured to send, to the UE, the handover command generated by the generating unit 802.

The evolved NodeB 80 may further include:

a determining unit 804, configured to: before the sending unit 803 sends the handover requirement message to the MME, determine that the UE supports handover from the LTE network to a PS domain of the 2G or 3G network; and/or before the sending unit 803 sends the handover command to the UE, determine that the UE supports the handover from the LTE network to the PS domain of the 2G or 3G network.

The evolved NodeB in this embodiment can implement the method steps of the evolved NodeB described in the method embodiments in FIG. 1A and FIG. 1B, FIG. 2A and FIG. 2B, and FIG. 6. A person skilled in the art may also learn an action of each unit in the evolved NodeB and a relationship between the units according to the steps executed in the method embodiments.

A person skilled in the art can understand that in the embodiments in FIG. 7 to FIG. 10, a sending unit configured to send a message may be implemented by a sender, and a receiving unit configured to receive a message may be implemented by a receiver. Alternatively, both the sending unit and the receiving unit may be implemented by a transceiver. Physically, the sender or transceiver may be implemented by one physical entity or by multiple physical entities, and the receiver and the transceiver may be implemented by one physical entity or by multiple physical entities, which is not limited in the present invention. Other units such as a generating unit, an allocating unit, a redirecting unit, a handover unit, and a determining unit may be implemented by one or more processors, which is not limited in the present invention. Programs executed by the processor in the embodiments of the present invention may be stored in a memory.

Compared with the prior art, in the apparatus provided in this embodiment of the present invention, in a process of handover from an LTE network to a CS domain of a 2G or 3G network, a radio resource bearer for handover from the LTE network to a PS domain of the 2G or 3G network is provided for a UE, so that the UE can be handed over to the PS domain of the 2G or 3G network. After being handed over to the PS domain, the UE can perform a CS domain call. A network triggers the handover from the LTE network to the CS domain of the 2G or 3G network, so that the network can prepare a voice resource for the CS domain in advance and shorten duration of a voice call.

Figure 11:
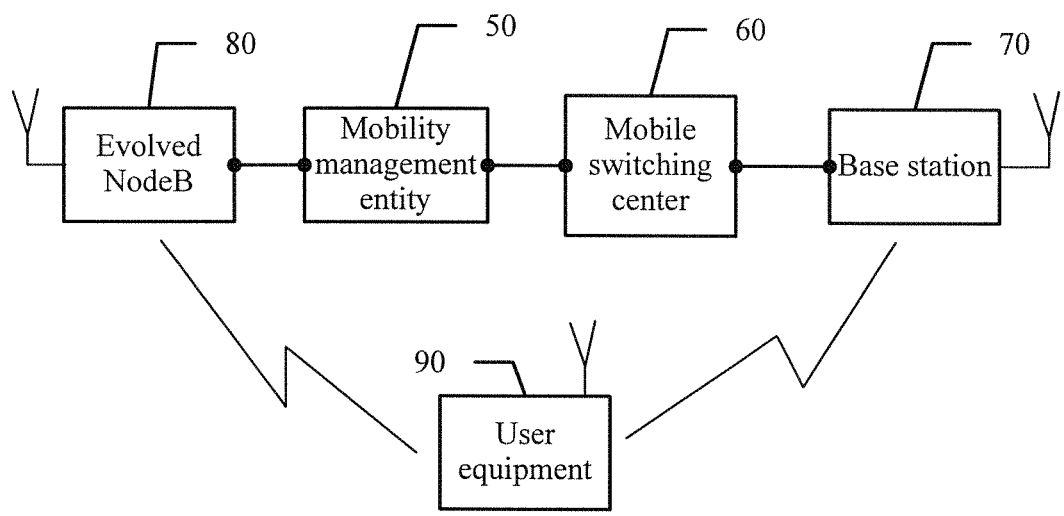
FIG. 11 is a schematic diagram of a network handover system according to an embodiment of the present invention.

Referring to FIG. 11, a network handover system provided in an embodiment of the present invention includes: a mobility management entity 50, an evolved NodeB 80, a mobile switching center 60, a base station 70, and user equipment 90.

For actions performed by the mobility management entity 50, the evolved NodeB 80, the mobile switching center 60, the base station 70, and the user equipment 90 and interactions of the mobility management entity 50, the evolved NodeB 80, the mobile switching center 60, the base station 70, and the user equipment 90, reference may be made to the descriptions about FIG. 1A and FIG. 1B, FIG. 2A and FIG. 2B and descriptions about the method embodiments and the apparatus embodiments in FIG. 3 to FIG. 10, and details are not described herein again.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A mobility management entity (MME), comprising:
a memory storing instructions; and
a processor coupled to the memory to execute the instructions to:
receive a request message sent by user equipment (UE) located in a Long Term Evolution (LTE) network, wherein the request message is used to request circuit switched fallback (CSFB),
send a first notification message to an evolved NodeB (eNB) according to the request message, wherein the first notification message is used to instruct the eNB to move the UE from the LTE network to a 2G or 3G network for the CSFB,
receive a handover requirement message sent by the eNB,
send a first handover request message to a mobile switching center (MSC), wherein the first handover request message is used to request the MSC to hand over the UE from the LTE network to a circuit switched (CS) domain of the 2G or 3G network for the CSFB,
receive a first handover request response message sent by the MSC, wherein the first handover request response message comprises a radio access bearer (RAB), and the RAB is a RAB whose domain identifier is a packet switched (PS) domain, or the RAB is a PS RAB, and
send a handover requirement response message to the eNB according to the first handover request response message, wherein the handover requirement response message comprises the RAB, so that the RAB is sent by the eNB to the UE.

2. The mobility management entity according to claim 1, wherein the first handover request message comprises first indication information, wherein the first indication information is used to:
request the MSC to hand over the UE from the LTE network to the CS domain of the 2G or 3G network for the CSFB; or
request the MSC to hand over the UE from the LIE network to the CS domain of the 2G or 3G network for the CSFB and is used to indicate that the UE supports handover from the LIE network to a PS domain of the 2G or 3G network.

3. The mobility management entity according to claim 1, wherein the handover requirement message comprises second indication information, wherein the second indication information is used to:
instruct the MME to hand over the UE from the LTE network to the CS domain of the 2G or 3G network for the CSFB; or
request the MME to hand over the UE from the LIE network to the CS domain of the 2G or 3G network for the CSFB and is used to indicate that the UE supports the handover from the LTE network to the PS domain of the 2G or 3G network.

4. The mobility management entity according to claim 1, wherein the first notification message comprises third indication information used to indicate that the LTE network and the 2G or 3G network support the handover of the UE from the LTE network to the CS domain of the 2G or 3G network for the CSFB.

5. The mobility management entity according to claim 4, wherein the third indication information is used to indicate that the LIE network and the 2G or 3G network support single radio voice call continuity (SRVCC) handover in the handover of the UE from the LTE network to the 2G or 3G network for the CSFB.

6. The mobility management entity according to claim 1, wherein the handover requirement message comprises:
a message of requiring the handover from the LTE network to the PS domain of the 2G or 3G network;
a message of requiring the handover from the LTE network to the CS domain of the 2G or 3G network; or
a message of requiring handover from the LTE network to the PS domain and the CS domain of the 2G or 3G network.

7. A mobile switching center (MSC), comprising:
a memory storing instructions; and
a processor coupled to the memory to execute the instructions to:
receive a first handover request message sent by a mobility management entity (MME), wherein the first handover request message is used to request the MSC to hand over user equipment (UE) from a Long Term Evolution (LTE) network to a circuit switched (CS) domain of a 2G or 3G network for circuit switched fallback (CSFB),
send a second handover request message to a base station of the 2G or 3G network, wherein the second handover request message is used to request the base station to hand over the UE from the LTE network to the CS domain of the 2G or 3G network for the CSFB, receive a second handover request acknowledgement message sent by the base station, wherein the second handover request acknowledgement message comprises a radio access bearer (RAB), and the RAB is a RAB whose domain identifier is a packet switched (PS) domain, or the RAB is a PS RAB, and send a first handover request response message to the MME, wherein the first handover request response message comprises the RAB.

8. The mobile switching center according to claim 7, wherein the second handover request message comprises fourth indication information, wherein the fourth indication information is used to:

request the base station to hand over the UE from the LTE network to the CS domain of the 2G or 3G network for the CSFB; or request the base station to hand over the UE from the LIE network to the CS domain of the 2G or 3G network for the CSFB and is used to indicate that the UE supports handover from the LTE network to a PS domain of the 2G or 3G network.

9. The mobile switching center according to claim 7, wherein the first handover request message comprises first indication information, wherein the first indication information is used to:

request the MSC to hand over the UE from the LTE network to the CS domain of the 2G or 3G network for the CSFB; or request the MSC to hand over the UE from the LTE network to the CS domain of the 2G or 3G network for the CSFB and is used to indicate that the UE supports the handover from the LTE network to the PS domain of the 2G or 3G network.

10. The mobile switching center according to claim 7, wherein the processor coupled to the memory is further configured to execute the instructions to:

receive a first CS call connection request message sent by the UE, wherein the first CS call connection request message is used to request the MSC to generate a first session for the UE; or send a second CS call connection request message to the UE, wherein the second CS call connection request message is used to request the UE to generate a second session.

11. The mobile switching center according to claim 10, wherein the processor coupled to the memory is further configured to execute the instructions to:

receive at least one of the following messages: a handover complete message sent by the base station, a connection management service request message sent by the UE, the first CS call connection request message sent by the UE, and a paging response message sent by the UE; and send a second notification message to the base station after receiving the at least one of the following messages or after sending the second CS call connection request message, wherein the second notification message is used to request the base station to allocate a CS domain resource to the UE.

12. A base station for use in a 2G or 3G network, the base station comprising:

a memory storing instructions; and
a processor coupled to the memory to execute the instructions to:

receive a second handover request message sent by a mobile switching center (MSC), wherein the second handover request message is used to request the base station to hand over user equipment (UE) from a Long Term Evolution (LIE) network to a circuit switched (CS) domain of the 2G or 3G network for circuit switched fallback (CSFB), send a second handover request acknowledgement message to the MSC, wherein the second handover request acknowledgement message comprises a radio access bearer (RAB), and the RAB is a RAB whose domain identifier is a packet switched (PS) domain, or the RAB is a PS RAB, receive a handover complete message sent by the UE, and send a second notification message to the UE, wherein the second notification message comprises a CS RAB allocated by the base station to the UE.

13. The base station according to claim 12, wherein the processor coupled to the memory is further configured to execute the instructions to:

receive a signaling message sent by the UE to the MSC; and after receiving the signaling message, send the signaling message to the MSC by means of a connection set up in a process of the handover from the LTE network to the CS domain of the 2G or 3G network, or send the signaling message to the MSC by using a direct transmission message.

14. The base station according to claim 12, wherein the second handover request message comprises fourth indication information, wherein the fourth indication information is used to:

request the base station to hand over the UE from the LTE network to the CS domain of the 2G or 3G network for the CSFB; or request the base station to hand over the UE from the LTE network to the CS domain of the 2G or 3G network for the CSFB and is used to indicate that the UE supports handover from the LTE network to a PS domain of the 2G or 3G network.

15. The base station according to claim 12, wherein the processor coupled to the memory is further configured to execute the instructions to:

allocate the CS RAB to the UE before the second handover request acknowledgement message is sent to the MSC, wherein the second handover request acknowledgement message does not comprise the CS RAB, or allocate the CS RAB to the UE after the second handover request acknowledgement message is sent to the MSC.

16. The base station according to claim 12, wherein the processor coupled to the memory is further configured to execute the instructions to:

receive a call setup message or a call acknowledgement message sent by the UE, or receive a call proceeding message sent by the MSC; and send the second notification message to the UE after receives the call setup message or the call acknowledgement message sent by the UE, or after receives the call proceeding message sent by the MSC.

17. The base station according to claim 12, wherein the processor coupled to the memory is further configured to execute the instructions to:

send universal mobile telecommunications system terrestrial radio access network (UTRAN) mobility information to the UE, wherein the UTRAN mobility information does not comprise a location area identity (LAI); and send the LAI to the UE after a preset time.

18. The base station according to claim 12, wherein the processor coupled to the memory is further configured to execute the instructions to:

send universal mobile telecommunications system terrestrial radio access network (UTRAN) mobility information to the UE, wherein the UTRAN mobility information does not comprise a location area identity (LAI);

receive a call release command sent by the MSC, a call connection success message sent by the MSC, or a call connection success message sent by the UE; and send the LAI to the UE after receives the call release command or the call connection success message.

19. The base station according to claim 12, wherein the processor coupled to the memory is further configured to execute the instructions to:

receive a call release message sent by the MSC; and redirect the UE to the LTE network according to the call release message, or hand over the UE to the LTE network according to the call release message.

20. The base station according to claim 12, wherein the processor coupled to the memory is further configured to execute the instructions to:

receive a location update request message sent by the UE, and determine skipping sending the location update request message to the MSC; and send a location update accept message to the UE.

* * * * *